US012735552B2

(12) United States Patent
Araya Hermosilla et al.

(10) Patent No.: US 12,735,552 B2
(45) Date of Patent: Sep. 15, 2026

(54) CROSS-LINKED AND RECYCLABLE ELECTROCONDUCTIVE CARBONACEOUS NANOCOMPOUNDS AND POLYMERS CAPABLE OF DISPERSING AND STABILISING THEM, METHOD, DERIVED MATERIALS AND USES

(71) Applicants: UNIVERSIDAD TECNOLÓGICA METROPOLITANA, Santiago (CL); UNIVERSIDAD AUSTRAL DE CHILE, Valdivia (CL)

(72) Inventors: Rodrigo Andrés Araya Hermosilla, Santiago (CL); Ignacio Moreno Villoslada, Valdivia (CL)

(73) Assignees: UNIVERSIDAD TECNOLÓGICA METROPOLITANA, Santiago (CL); UNIVERSIDAD AUSTRAL DE CHILE, Valdivia (CL)

( * ) Notice: Subject to any disclaimer, the term of this patent is extended or adjusted under 35 U.S.C. 154(b) by 1016 days.

(21) Appl. No.: 17/765,323

(22) PCT Filed: Sep. 30, 2020

(86) PCT No.: PCT/CL2020/050109
§ 371 (c)(1),
(2) Date: Mar. 30, 2022

(87) PCT Pub. No.: WO2021/062571
PCT Pub. Date: Apr. 8, 2021

(65) Prior Publication Data

US 2022/0389186 A1 Dec. 8, 2022

(30) Foreign Application Priority Data

Sep. 30, 2019 (CL) .................................. 2791-2019

(51) Int. Cl.

| | |
|---|---|
| ***C08K 3/04*** | (2006.01) |
| ***B82B 3/00*** | (2006.01) |
| ***C01B 32/15*** | (2017.01) |
| ***C08J 5/24*** | (2006.01) |
| ***H01B 1/24*** | (2006.01) |

(52) U.S. Cl.
CPC .................. *C08K 3/04* (2013.01); *B82B 3/00* (2013.01); *C01B 32/15* (2017.08); *C08J 5/24* (2013.01); *H01B 1/24* (2013.01)

(58) Field of Classification Search
None
See application file for complete search history.

(56) References Cited

U.S. PATENT DOCUMENTS

| | | | |
|---|---|---|---|
| 7,105,596 B2 | 9/2006 | Smalley et al. | |
| 7,108,914 B2 | 9/2006 | Skipor et al. | |
| 9,490,045 B2 | 11/2016 | Tee et al. | |
| 2009/0015272 A1 | 1/2009 | Jones et al. | |
| 2009/0294022 A1 | 12/2009 | Hayes et al. | |
| 2011/0190458 A1 | 8/2011 | Broekhuis et al. | |
| 2014/0186476 A1 | 7/2014 | Hemmelgarn et al. | |
| 2017/0008998 A1 | 1/2017 | Sodano et al. | |
| 2019/0002680 A1* | 1/2019 | Kim | B29C 70/02 |

FOREIGN PATENT DOCUMENTS

| | | |
|---|---|---|
| CA | 3 055 734 | 9/2018 |
| EP | 2 498 313 | 9/2012 |
| MX | 2017003330 | 9/2018 |
| WO | 2007/005657 | 1/2007 |
| WO | 2014/201603 | 12/2014 |
| WO | 2015/015120 | 2/2015 |

OTHER PUBLICATIONS

Cai, et al., “Methods of graphite exfoliation”, Journal of Materials Chemistry, 48, 2012—Abstract.

Araya-Hermosilla, et al., “An easy synthetic way to exfoliate and stabilize MWCNTs in a thermoplastic pyrrole-containing matrix assisted by hydrogen bonds”, RSC Adv., 2016, 6, 85829-85837.

Leng, et al., “Multifunctional Polymer Nanocomposites”, CRC Press, Taylor & Francis Group, 2010, 108 pages.

Imtiaz, et al., “A Review Featuring Fabrication, Properties and Applications of Carbon Nanotubes (CNTs) Reinforced Polymer and Epoxy Nanocomposites”, Chinese J. Polym. Sci 2018, 36, 445-461.

Kasaliwal, et al., “Influence of material and processing parameters on carbon nanotube dispersion in polymer melts”, Polymer-Carbon Nanotube Composites—Preparation, Properties and Applications, 2011, 92-132.

(Continued)

*Primary Examiner* — Robert T Butcher
(74) *Attorney, Agent, or Firm* — PROCOPIO, CORY, HARGREAVES & SAVITCH LLP

(57) ABSTRACT

The present invention relates to cross-linked and recyclable nanocompounds obtained by in situ terminal treatment of raw carbonaceous materials, including charcoal, tar, activated carbon, pyrolytic carbon, coke, graphite or others having conductive structures, including graphite, graphene, different carbon nanotubes, fullerenes or a combination thereof or their derivatives, and a polymer capable of dispersing and reversibly stabilising said components, having viscous or fluid behaviour below 200 °C, and may have pendant groups acting as diene or dienophile, including furan-functionalised aliphatic polyketones, furan-functionalised polyesters, ethylene rubber with propylene functionalised with furan groups or a combination thereof. Derived materials, method of obtainment and their uses as a thermostable, thermoreversible, thermoadhesive, thermoconductive, electroconductive, self-repairing additive or matrix capable of converting electricity into heat or a combination thereof and in self-assembling or self-repairing, thermoconductive, electroconductive materials capable of converting electricity into heat or a combination thereof.

22 Claims, 10 Drawing Sheets

(56) References Cited

OTHER PUBLICATIONS

Guadagno, et al., "Effect of functionalization on the thermo-mechanical and electrical behavior of multi-wall carbon nanotube/epoxy composites", Carbon 49, 2011 1919-1930.
McNally, et al., "Polymer-carbon nanotube composites—Preparation, properties and applications", Woodhead Publishing, 2011, 17 pages.
Ma, et al., "Degradable thermosets based on labile bonds or linkages: A review", Progress in Polymer Science, 76, 2018, 65-110.
Yang, et al., Chemical and physical aspects of self-healing materials, Progress in Polymer Science 49-50, 2015, 34-59.
Chen, et al., "Characterization of thermally reworkable thermosets: materials for environmentally friendly processing and reuse", Polymer 43, 2002, 131-139.
An, et al., "Recent strategies to develop self-healable crosslinked polymeric networks", Chemical Communications 66, 2015—Abstract.
Chang, et al., Functionalization of multi-walled carbon nanotubes with furan and maleimide compounds through Diels-Alder cycloaddition:, Carbon 47, 2009, 3041-3049.
Zydziak, et al., "One-Step Functionalization of Single-Walled Carbon Nanotubes (SWCNTs) with Cyclopentadienyl-Capped Marcomolucules via Diels-Alder Chemistry", Macromolecules 2011, 44, 3374-3380.
Polgar, et al., "Use of Diels-Alder Chemistry for Thermoreversible Cross-Linking of Rubbers: The Next Step toward Recycling of Rubber Products?", Macromolecules 2015, 48, 7096-7105.
Ursache, et al., "Studies on Diels-Alder thermoresponsive networks based on ether-urethane bismaleimide functionalized poly(vinyl alcohol)", J Therm Anal Calorim 2014, 118, 1471-1481.
Liu, et al., "Self-healing polymers based on thermally reversible Diels-Alder chemistry", Polymer Chemistry, 7, 2013—Abstract.
Gandini, et al., "The furan/maleimide Diels-Alder reaction: A versatile click-unclick tool in macromolecular synthesis", Progress in Polymer Science 38, 2013, 1-29.
Zhang, et al., "Thermally Self-Healing Polymeric Materials:, The Next Step to Recycling Thermoset Polymers?", Macromolucules 2009, 42, 1906-1912.
Araya-Hermosilla, et al., "Intrinsic self-healing thermoset through covalent and hydrogen bonding interactions", European Polymer Journal 81, 2016, 186-197.
Araya-Hermosilla, et al., "Reversible polymer networks containing covalent and hydrogen bonding interactions", European Polymer Journal 50, 2014, 127-134.
Yang, et al., "Functionalization of carbon nanotubes for polymer nanocomposites", Polymer-Carbon Nanotube Composites—Preparation, Properties and Applications, 2011, 55-91.
International Search Report issued in International Application Application No. PCT/CL2020/050109, Jan. 13, 2021, 6 pages w/translation.
Migliore, et al., "Effect of the Polyketone Aromatic Pendent Groups on the Electrical Conductivity of the Derived MWCNTs-Based Nanocomposites", Polymers 2018, 10, 618, 16 pages.
Mar Bernal, et al., "Modification of carbon nanotubes with well-controlled fluorescent styrene-based polymers using the Diels-Alder reaction", Polymer, 52:25, Nov. 28, 2011, 5739-5745—Abstract only.
Araya-Hermosilla, et al., "Electrically-Responsive Reversible Polyketone/MWCNT Network through Diels-Alder Chemistry", Polymers 2018, 10, 1076, 15 pages.
Zhang, et al., "Polymeric Amines by Chemical Modifications of Alternating Aliphatic Polyketones" Journal of Applied Polymer Science, 2008, 107, 262-271.

* cited by examiner

Polyketone

R: H, $CH_3$

Furfurylamine $NH_2$

Paal-Knorr reaction in bulk

100 °C

4 Hours

PK-Fu

PK-Fu

R: $CH_3$, H

NMP 50 °C, 24 h

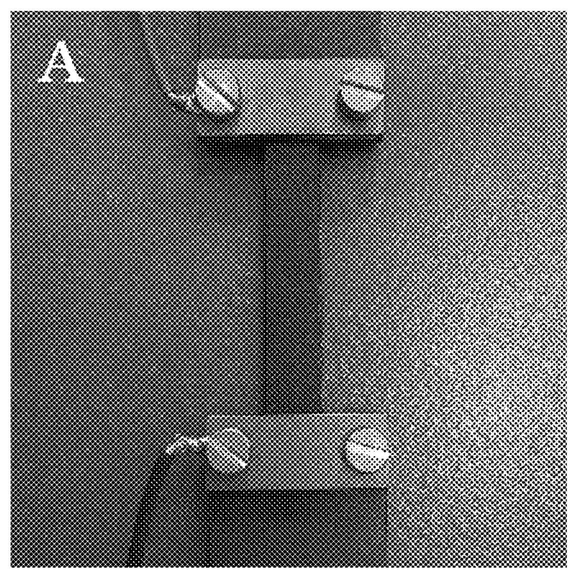
Figure 4A
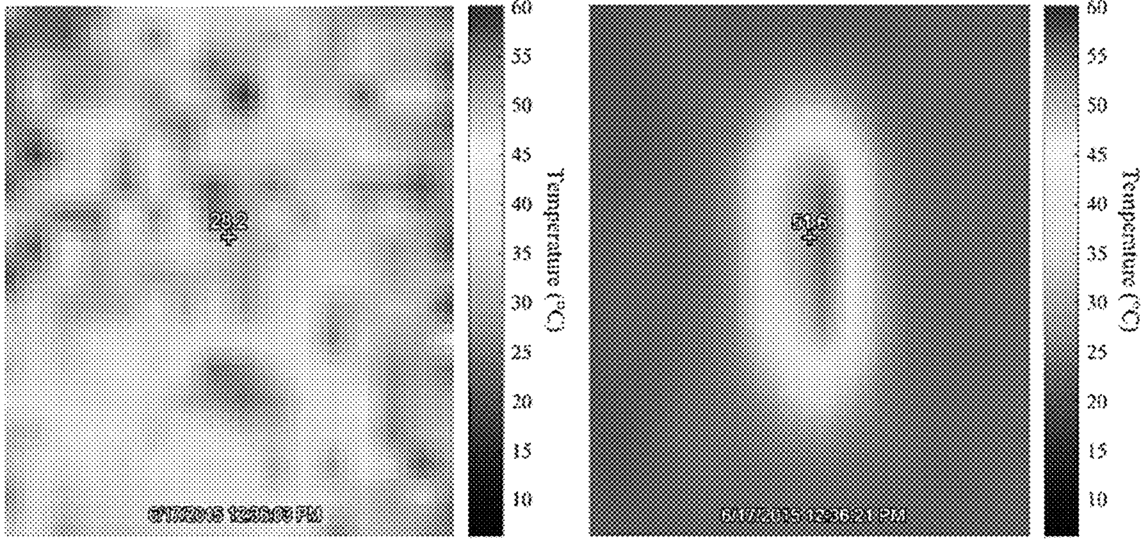
Figure 4B
Figure 4C

CROSS-LINKED AND RECYCLABLE ELECTROCONDUCTIVE CARBONACEOUS NANOCOMPOUNDS AND POLYMERS CAPABLE OF DISPERSING AND STABILISING THEM, METHOD, DERIVED MATERIALS AND USES

FIELD OF THE INVENTION

The present invention refers to cross-linked and recyclable nanocomposites that can be used as additive or matrix for the manufacture of materials, and that provide thermostability properties, thermoreversibility, thermoadhesiveness, heat conductivity, electroconductivity, self-repair, self-assembly, conversion of electricity to heat, or a combination thereof. Said nanocomposites can be obtained by an in situ method by thermal treatment, from raw carbonaceous materials (Pure and Applied Optics 40 (2) 149-159 (2007)), including char, pitch, activated carbon, pyrolytic carbon, coke, graphite, organic material combustion residues, or selected from other carbonaceous materials comprising conductive structures, including graphite, graphene, carbon nanotubes including multi-walled carbon nanotubes and single-walled carbon nanotubes, fullerenes, or a combination of the themselves or their derivatives, and a polymer capable of reversibly dispersing and stabilizing said components, where said polymer has a viscous or fluid behaviour below 200 °C, where said polymer is selected from a derivatized polymer with pendant groups that act as diene or dienophilic, preferably said derivatized polymer with pendant groups acting as diene or dienophilic is selected from p furan functionalized aliphatic olketones, furan functionalized polyesters, furan functionalized ethylene propylene gum, or a combination thereof. The invention also relates to materials derived from these nanocomposites that import their unique inherent properties to give them properties of thermostability, thermoreversibility, thermosetting, thermoconductivity, electroconductivity, self-repair, self-assembly, conversion of electricity into heat, or a combination thereof. The invention also refers to a method of obtaining said nanocomposites, and use of the nanocomposites as additive or thermosetting, thermoreversible, thermoadhesive, thermoconductive, electroconductive, self-repairing, heat-converting electricity, or a combination thereof, and use of derived materials in applications made of self-assembling, self-healing, heat-conducting, electro-conducting materials, electricity-heat converters, or a combination thereof.

BACKGROUND

Composite materials containing graphene, carbon nanotubes, or nano-dispersed and interconnected fullerenes exhibit exceptional properties that can lead to advanced, next-generation materials. However, the high cost of producing graphene, carbon nanotubes and fullerenes greatly limits their adoption by the market. Therefore, methods have been sought to emulate the properties of said compounds from raw materials such as char, pitch, activated carbon, pyrolytic carbon, coke, graphite, combustion residues of organic material, or other mixtures of carbonaceous materials. For example, one of the strategies to obtain materials with the properties of graphene from graphite consists of the exfoliation of graphite in graphene by means of mechanical exfoliation by agitation and sonication assisted by organic solvents, surfactants or liquid ions. The exfoliation of graphite in graphene can also be carried out by thermal treatments, by means of conventional heating and microwave irradiation assisted by solvents and surfactants. Another form of exfoliation of graphite on graphene is through supercritical fluids with carbon monoxide or assisted with organic solvents such as dimethylformamide and N-methylpyrrolidone (Minzhen Cai., Et. al., Methods of graphite exfoliation. J. Mater. Chem., 22, 24992, (2012)). There have also been successful examples of exfoliation of carbon nanotube aggregates (Araya-Hermosilla, R., et. al., An Easy Synthetic Way to Exfoliate and Stabilize MWCNTs in a Thermoplastic Pyrrole-Containing Matrix Assisted by Hydrogen Bonds. RSC Adv. 2016, 6, 85829-85837).

Composite materials containing graphene, carbon nanotubes, or fullerenes contain, in addition to carbonaceous structures, polymers that serve as a dispersing and structuring matrix for the material. Conductive polymer nanocomposites are an important class of materials used in a wide range of applications, including supercapacitors, solar cells, conductive adhesives, advanced electronic devices, among many others (Leng, J.; Kin-Tak Lau, A. Multifunctional Polymer Nanocomposites; Taylor and Francis Group: Boca Raton, FL, USA; London, UK; New York, NY, USA, 2011). For example, polymer nanocomposites with carbon nanotubes Cross-linked offer many superior properties compared to those based solely on thermoplastic polymers, such as mechanical strength, dimensional stability at elevated temperature, solvent resistance, and reliable electrical performance due to the conductive network of well-dispersed carbon nanotubes (Imtiaz, S.; Siddiq, M.; Kausar, A.; Muntha, ST; Ambreen, J.; Bibi, I. A Review Featuring Fabrication, Properties and Applications of Carbon Nanotubes (CNTs) Reinforced Polymer and Epoxy Nanocomposites. Chin. J. Polym. Sci. 2018, 36, 445-461).

The success or failure of a blend of functional polymers with conductive carbonaceous structures to form useful materials for such applications depends, in part, on the interfacial interactions that occur when the matrix polymers are mixed with the nanodispersed carbonaceous materials. Interface stability for carbon nanotube reinforced thermoplastics is difficult to achieve due to the lack of effective adhesion between components. As a consequence, some thermoplastic materials show poor dispersion of carbon nanotubes during the melt mixing process, resulting in poor exfoliation and aggregated structures (Kasaliwal, GR; Villmow, T.; Pegel, S.; Nitschke, P. Influence of material and processing parameters on carbon nanotube despersion in polymer melts. In Polymer-Carbon Nanotube Composites; McNally, T., Nitschke, P., Eds.; Woodhead Publishing Limited: Cambridge, UK, 2011; p. 92), while other nanocomposites based on direct mixing between carbon nanotubes and thermoplastic polymers have resulted in materials with outstanding performance due to the synergistic effect between the inherent characteristics of carbon nanotubes and the type of interaction at the interface with the matrix. (McNally, T. & Nitschke, P. Polymer-Carbon Nanotube Composites; Woodhead Publishing Limited: Philadelphia, PA, USA, (2011)). The latest progress in this field established that the dispersion, exfoliation and stabilization of carbon nanotubes increase when an effective interfacial covalent bond is formed between the filler and the matrix (Imtiaz, S.; Siddiq, M.; Kausar, A.; Muntha, ST; Ambreen, J.; Bibi, I. A Review Featuring Fabrication, Properties and Applications of Carbon Nanotubes (CNTs) Reinforced Polymer and Epoxy Nanocomposites. Chin. J. Polym. Sci. 2018, 36, 445-461). However, this method has disadvantages with respect to the chemical oxidation of the graphical Sp 2 hybridization state of carbon nanotubes, which reduces their conductivity and performance. mechanical (Guadagno, L;

De Vivo, B.; Di Bartolomeo, A.; Lamberti, P.; Sorrentino, A.; Tucci, V.; Vertuccio, L; Vittoria, V. Effect of Functionalization on the Thermo-Mechanical and Electrical Behavior of Multi-Wall Carbon Nanotube/Epoxy Composites. Coal 2011, 49, 1919-1930; Yang, Y.; Xie, X.; Mai, Y. Functionalization of Carbon Nanotubes for Polymer Nanocomposites. In Polymer-Carbon Nanotube Composites; Woodhead Publishing: Sawston/Cambridge, UK, 2011; pp. 55-91).

On the other hand, the morphological and thermomechanical properties, such as crystallinity, viscosity, hardness, toughness, softening temperature, melting temperature and degradation temperature of the composite materials and their derivatives also depend on variables inherent to the polymers used, such as molecular weight, chemical structure, and molecular structure and morphology. By varying the comonomer composition when using copolymers some of these properties can be modulated. The functionalization of polymeric chains with different structures is also a resource that allows the modulation of the aforementioned properties. Additionally, the use of crosslinking materials allows the transition from thermoelastic behaviour to thermosetting behaviour.

Despite the advanced properties of polymeric nanocomposites with conductive carbonaceous nanostructures and cross-linking materials, they generally cannot be reprocessed after their useful life, making them difficult to recycle in the circular economy arena, a cornerstone in current efforts for sustainability. A promising strategy currently employed in the fabrication of reprocessable and thermoset crosslinked polymer systems is the incorporation of thermally reversible reactive chemical groups used to reprocess and recycle the crosslinked polymeric network after the end of the product life (Ma, S.; Webster, D. C. Degradable Thermosets Based on Labile Bonds or Linkages: A Review. Prog. Polym. Sci. 2018, 76, 65-110). The most common approach is based on Diels-Alder chemistry (reversible covalent cycloaddition) (Yang, Y.; Ding, X.; Urban, MW Chemical and Physical Aspects of Self-Healing Materials. Prog. Polym. Sci. 2015, 49-50, 34-59; Chen, J.; Ober, C.; Poliks, M. Characterization of Thermally Reworkable Thermosets: Materials for Environmentally Friendly Processing and Reuse. Polymer 2002, 43, 131-139; An, S Y; Arunbabu, D.; Noh, S M; Song, Y K; Oh, J K Recent Strategies to Develop Self-Healable Crosslinked Polymeric Networks. Chem. Commun. 2015, 51, 13058-13070). In the scientific literature, the formation of covalent bonds between cyclopentadiene, furan and bis-maleimide with carbon nanotubes has been described through Diels-Alder chemistry (Chang, C; Liu, Y. Functionalization of Multi-Walled Carbon Nanotubes with Furan and Maleimide Compounds through Diels-Alder Cycloaddition. Carbon 2009, 47, 3041-3049; and Zydziak, N.; Fluebner, C.; Bruns, M.; Barner-Kowollik, C. One-Step Functionalization of Single-Walled Carbon Nanotubes (SWCNTs) with Cyclopentadienyl-Capped Macromolecules via Diels-Alder Chemistry. Macromolecules 2011, 44, 3374-3380). Once the useful life is over, the thermal repair of the materials occurs when the functional reactive chemical groups are activated, generating disconnections and reconnections of Diels-Alder chemical bonds, due to the reversibility of the chemical reaction of bond formation (Polgar, L M; van Duin, M.; Broekhuis, AA; Picchioni, F. The use of Diels-Alder Chemistry for Thermo-Reversible Cross-Linking of Rubbers: The Next Step Towards Recycling of Rubber Products? Macromolecules 2015, 48, 7096-7105; Ursache, O.; Gaina, C.; Gaina, V.; Tudorachi, N.; Bargan, A.; Varganici, C.; Rosu, D. Studies on Diels-Alder Thermoresponsive Networks Based on Ether-Urethane Bismaleimide Functionalized Poly (Vinyl Alcohol). J. Therm. Anal. Calorim. 2014, 118, 1471-1481; and Liu, Y.; Chuo, T. Self-Healing Polymers Based on Thermally Reversible Diels-Alder Chemistry. Polym. Chem. 2013, 4, 2194-2205; Gandini, A. The Furan/Maleimide Diels-Alder Reaction: A Versatile Click-unclick Tool in Macromole cular Synthesis. Prog. Polym. Sci. 2013, 38, 1-29)). The formation of bonds through the Diels-Alder reaction is predominant at temperatures between 0 °C and 80 °C, while the breaking of the bonds formed (retro-Diels-Alder) becomes predominant over their formation at temperatures higher, between 90 and 150 °C. However, at even higher temperatures (160-300 °C) secondary reactions such as aromatization of the adducts can mostly occur, which leads to a loss of reversibility of the bonds.

For these mechanisms to come into play, the active Diels-Alder groups must be present throughout the polymer chain, and this often requires lengthy and cumbersome chemical polymerization reactions and/or modification strategies. An easier alternative is the introduction of aliphatic polyketones by copolymerizing carbon monoxide, ethylene, and propylene using the Paal-Knorr reaction to insert furan groups directly attached to the polymer chain (Zhang, Y.; Broekhuis, A A; Picchioni, F. Thermally Self-Healing Polymeric Materials: The Next Step to Recycling Thermoset Polymers? Macromolecules 2009, 42, 1906-1912; Araya-Hermosilla, R.; Lima, G.; Raffa, P.; Fortunato, G.; Pucci, A.; Flores, M. E.; Moreno-Villoslada, I.; Broekhuis, A.; Picchioni, F. Intrinsic Self-Healing Thermoset through Covalent and Flydrogen Bonding Interactions. Eur. Polym. J. 2016, 81, 186-197; and Araya-Flermosilla, R.; Broekhuis, A. A.; Picchioni, F. Reversible Polymer Networks Containing Covalent and Flydrogen Bonding Interactions. Eur. Polym. J. 2014, 50, 127-134). This chemical reaction proceeds with high yields and relatively fast kinetics, producing water as the only by-product (Zhang, Y.; Broekhuis, A A; Stuart, MCA; Picchioni, F. Polymeric Amines by Chemical Modifications of Alternating Aliphatic Polyketones. J. Appl Polym. Sci. 2008, 107, 262-271). The furan chemical groups grafted onto the polymer chain have, for example, allowed the formation of a three-dimensional polymer network after crosslinking with aromatic bis-maleimide. In fact, the material formed is thermally reversible and self-curing thermoset using the Diels-Alder and retro-Diels-Alder sequence employing conventional heating procedures and post-cure thermal annealing (Zhang, Y.; Broekhuis, AA; Picchioni, F. Thermally Self-Healing Polymeric Materials: The Next Step to Recycling Thermoset Polymers? Macromolecules 2009, 42, 1906-1912).

Regarding the exfoliation of carbonaceous substances to give nanometric conductive structures, in the prior art it is possible to mention W02015015120A1 (Universite de Bordeaux; Inst Polyt. Bordeaux; Sci. Nat. Center), which refers to a method of exfoliation of graphite in carbonaceous materials facilitated by the Diels-Alder reaction, and their applications, in particular for the manufacture of electronic or microelectronic components such as transparent conductive electrodes; and Diels-Alder adducts that can be obtained by said process, graphene planes that can be obtained from these adducts, and uses of these graphene planes. It is noted that in general, exfoliation processes require the use of heavy solvents (methylpyrrolidine, boiling point 202 °C), strongly halogenated (1,2-dichlorobenzene), or not very compatible with applications in the electronics industry (ionic liquids). In addition, they often require high doses of ultrasound that lead to a high rate of degradation of the graphene obtained, which is detrimental to its performance in industrial applications. Furthermore, these methods have the disadvantage that the graphite planes obtained are functionalized and/or denatured, and proposes a method to obtain high quality graphene sheets with few defects in known solvents where to exfoliate graphite in carbonaceous materials facilitated by a Diels-Alder reaction, and its applications, in particular to produce electronic or microelectronic components such as transparent conductive electrodes. The method is characterized in that it comprises a Diels-Alder reaction between a material containing graphite and an anthrone compound in an organic solvent, in the presence of a base, and subjected to sonication, trituration and/or mixing, at a temperature between 15 °C and 65 °C, to obtain the corresponding Diels-Alder graphene adduct. The organic solvent can be selected from a saturated or unsaturated aliphatic or alicyclic hydrocarbon, an aromatic hydrocarbon, an alcohol preferably comprising at least 3 carbon atoms, a glycol, a halogenated hydrocarbon, a ketone, an ester, an ether, a glycol ether or other suitable organic solvent, or a mixture of two or more thereof. In particular, the organic solvent is chosen from tetrahydrofuran (THF), acetonitrile, N-methyl-2-pyrrolidone (NMP), dimethylformamide (DMF), 2-propanol, toluene, benzene, chlorobenzene 1,2-dichlorobenzene.

WO2014201603A1 (Shanghai Pengxin Advanced Materials Technologies, Ltd.) provides methods by which carbon nanotubes can be functionalized by Diels-Alder reactions under solvent-free conditions. Such methods include reacting carbon nanotubes with dienes or Diels-Alder dienophiles to obtain adducts that include the diene or dienophile grafted to the carbon nanotubes. Functionalized carbon nanotubes and dispersions containing functionalized carbon nanotubes are provided. Said invention provides methods of functionalization of carbon nanotubes through reactions in the gas phase, in the liquid phase or in the solid phase without any solvent other than the reagents. Such processes are also susceptible to a wide variety of chemical reactions using other functionalizing agents. Furthermore, these methods are cost-effective, easily scalable, and can provide generally functionalized carbon nanotubes. The diene can be selected from cyclopentadiene, dicyclopentadiene, furan, butadiene, anthracene, tetracene, pentacene, etc. The dienophile is selected from maleic anhydride, maleic imide, benzoquinone, alkyne, alkene, etc.

U.S. Pat. No. 7,105,596B2 (William Marsh Rice University) refers generally to a method for producing single-walled carbon nanotube composites and compositions thereof, where the composite material includes a matrix comprising a polymer and a carbon nanotube material embedded within of said matrix. Alternatively, a method for producing a composite material containing carbon nanotube material is described comprising the steps of preparing an assembly of a fibrous material; adding the carbon nanotube material to the fibrous material; and adding a matrix precursor material to the carbon nanotube material and the fibrous material. Where said polymer can be a thermosetting polymer comprising a polymeric material selected from the group consisting of polyesters of the phthalic/maleic type, vinyl esters, epoxies, phenolics, cyanates, bismaleimides and nodic polyimides. Alternatively, said polymer can be a thermoplastic polymer comprising a polymeric material selected from the group consisting of polysulfones, polyamides, polycarbonates, polyphenylene oxides, polysulfides, polyether ketone, polyethersulfones, polyamide-imides, polyetherimides, polyimides, polyarylates and crystalline polyester liquids.

US20110190458A1 (University of Groningen) which refers to a moldable cross-linked resin comprising polymer chains that are connected to each other through Diels-Alder adducts obtainable by a substituted furan and a dienophile, to a composition that is suitable for the preparation of the mouldable crosslinked resin, and to the method of preparing the substituted furan and the mouldable crosslinked resin.

WO 2007/005657 (Dry Carolyn) relates to matrix materials for use in a wide variety of fields and end use applications. More particularly, it relates to self-healing, configurable or curable matrix material systems containing reactive chemicals used in conjunction with release vessels or conduits such as fibres, the functions of which can be multiple. In particular, it claims a laminated composite comprising at least two layers of graphite material; and at least one auto repair conduit present in a matrix between at least two layers of graphite material, where the auto repair conduit has a modifying agent configured to withstand a temperature of at least 121.1 °C for at least one hour without degradation, and in that the modifying agent is configured to repair the laminate after a 1.12 calories to 11.2 calories (5 to 50 joules) impact, the repair being at least 70% prior to impact.

EP249S313A2 (Danfoss) refers to a multilayer composite with electrically conductive layers and layers of a dielectric material placed alternately with each other. The multilayer composite can be used for conversion between electrical and mechanical energies and therefore can be used as a sensor, an actuator, a generator or a transformer; These four structures will hereinafter be referred to as transducers. In particular, it claims a composite exhibiting a self-healing mechanism, the composite material comprises a film made of a dielectric material and having a front surface and a back surface, the front surface and the back surface comprising a surface pattern of portions high and depressed surface; a first electrically conductive layer that is deposited on the surface pattern of the front surface, the first electrically conductive layer has a wavy shape that is formed by the surface pattern of the front surface of the film; a second electrically conductive layer that is deposited on the surface pattern of the back surface, the second electrically conductive layer has a corrugated shape which is formed by the surface pattern of the back surface of the film.

U.S. Pat. No. 7,108,914 B2 (Motorola, Inc.) relates to a microencapsulated polymerizable composite, a method for preparing the microencapsulated composition, a self-healing polymer composition, and a method for preparing the self-healing composition. In particular, it claims a microencapsulated polymerizable composition comprising: a microcapsule; a fluid polymerizable material within the microcapsule; and at least one polymerization agent associated with an external surface of the microcapsule, the polymerization agent is effective to induce polymerization of the fluid polymerizable material upon rupture of the microcapsule and contact between the polymerization agent and the fluid polymerizable material.

US2014186476A1 (Cornerstone Res Group Inc) refers to the repair of polymer structures and polymer compounds. The indicated method to achieve this involves designing and incorporating intelligent and adaptive systems into structures composed of adaptive materials such as dynamic modulus resins and composites. In particular, it claims a self-healing system that includes: at least one composite panel formed from a stacked layer cured product, the stacked layers comprise: a first layer of an adaptive structure comprising a memory polymer chosen from thermoset memory polymers and memory thermoplastic polymers, a second layer comprising an array of heating elements; and a third layer comprising a grid-like sensor array.

U.S. Pat. No. 9,490,045 B2 (The Board of Trustees of the Leland Stanford Junior University) refers to a battery electrode, with a self-healing composite and a piezo-resistant sensor. In particular, it claims a battery electrode, comprising: an electrochemically active material; and a binder that covers the electrochemically active material and includes a self-healing polymer.

US2009015272A1 (Sheffield University) corresponds to self-healing composites, and more particularly to a self-healing composite material comprising a fibre-reinforced polymer matrix. In particular, it claims a self-healing composite material comprising a fibre-reinforced polymeric matrix, wherein the polymeric matrix comprises a thermosetting polymer and a thermoplastic polymer that together form a solid solution.

US2009294022A1 (Sheffield University) relates to damage detection, and more particularly to a composite provided with a damage detection system; The material comprises a fibre-reinforced polymeric matrix, wherein the fibre reinforcement comprises electrically conductive fibres and the polymeric matrix comprises a thermosetting polymer and a thermoplastic polymer, wherein detection means are provided to detect a change in a measurable characteristic of the composite, said change in said measurable characteristic indicating the presence of at least one damaged area of the composite, said sensing means comprising a plurality of separate electrodes mounted on an electrically insulating substrate and electrically connected to the electrically conductive fibres.

BRIEF DESCRIPTION OF THE INVENTION

A first objective of the invention is the cross-linked and recyclable nanocomposites that can be used as an additive or as a matrix for the manufacture of materials, and that provide properties of thermostability, thermoreversibility, heat adhesion, heat conductivity, electroconductivity, self-repair, self-assembly, conversion of electricity to heat, or a combination thereof. Said nanocomposites can be obtained by an in situ method by thermal treatment, from raw carbonaceous materials such as char, pitch, activated carbon, pyrolytic carbon, coke, graphite, combustion residues of organic material, or selected from other carbonaceous materials comprising conductive structures, including graphite, graphene, carbon nanotubes, fullerenes, or a combination thereof or their derivatives, and a polymer capable of reversibly dispersing and stabilizing said components, where said polymer has a viscous or fluid behaviour below 200 °C, where said polymer is selected from a derivatized polymer with pendant groups that act as diene or dienophilic, preferably said derivatized polymer with pendant groups that act as diene or dienophile is selected from furan-functionalized aliphatic polyketones, furan-functionalized polyesters, rubber ethylene with propylene functionalized with furan groups or a combination thereof.

Another objective of the invention is the materials derived from these nanocomposites that import their unique inherent properties to give them properties of thermostability, thermoreversibility, thermoadhesiveness, thermoconductivity, electroconductivity, self-repair, self-assembly, conversion of electricity into heat, or a combination thereof.

Another objective of the invention is a method for obtaining said nanocomposites.

It is still another objective of the invention, the use of said nanocomposites as an additive or matrix thermosetting, thermoreversible, thermoadhesive, thermoconductive, electroconductive, binder, self-repairing, self-assembling, converting electricity into heat, or a combination thereof. The present invention provides electrically conductive polymer networks based on derivatized polymers with pendant groups that act as diene or dienophiles capable of producing Diels-Alder reactions with conductive components such as graphene structures, carbon nanotubes or fullerenes, contained in crude carbonaceous materials of low cost, such as charcoal, pitch, activated carbon, pyrolytic carbon, coke, graphite, organic material combustion residue, etc. Said Polymers have a viscous or fluid behaviour below 200 °C, which allows that in the absence of unions with conductive carbonaceous structures, as a result of the retro-Diels-Alder reaction at temperatures close to 100-150 °C, the polymeric chains have sufficient mobility to allow the diffusion of carbonaceous structures, self-assembly, reprocessing and recycling of the materials of which the polymer is a part, while at low temperatures, due to the formation of bonds with carbonaceous structures, As a result of the Diels-Alder reaction, the polymeric chains are intertwined and cross-linked with the carbonaceous structures, acquiring a thermosetting crosslinked polymeric matrix behaviour. The present method also allows the separation of said conductive carbon structures from the raw materials and their dispersion in the polymeric matrix by means of thermal processes, taking advantage of reversible covalent interactions, sensitive to temperature. Said covalent interactions provided by the aforementioned polymers, due to both the strength of the bonds that occur and their reversibility, cause the aforementioned conductive carbonaceous structures to be stripped from the matrix of the carbonaceous material and dispersed in the polymeric material. by thermal action in situ.

The resulting nanocomposites can be used to manufacture materials with electrical current conducting characteristics, heat producing, thermally processable, varying from thermoplastic to thermosetting properties, and that promote self-repair and recycling. The dynamics of formation-breaking of covalent bonds between the polymeric matrix and the conductive carbonaceous structures provides an effective exfoliation, dispersion and stabilization of the conductive carbonaceous structures, a crosslinking of the same, which allows electrical and thermal conductivity, and, depending on temperature, a dual behaviour between thermosetting and thermoplastic. In particular, its use is proposed as a thermosetting, thermoreversible, thermoadhesive, thermoconductive, electroconductive, binding, self-repairing, self-assembling additive or matrix, converting electricity into heat, or a combination thereof. The nanocomposites of the present invention can be used to obtain materials with electron conducting properties, Joule effect resistive heating for the transduction of energy at temperature (0-150 °C), capacity of self-assembly and self-repair or energy transport and storage, which can be used as thermoelectroactive materials, including heating panels and electrically self-healing structures.

Alternatively, the composite material can be reduced to a powder and provided for further processing as a matrix, binder, seal, additive or filler for the generation of advanced materials, for example, by mixing with cellulose fibres, inorganic particles, metal salts, metal oxides, metals and metallic nanoparticles or other polymeric materials, and that can later be processed by extrusion, compression molding, among other conventional techniques to process polymeric composite materials. The present invention would then enable the cost-effective industrial production of cross-linked and recyclable, electrically conductive nanocomposites, endowed with intrinsic reconnection characteristics activated by resistive heating (Joule effect) of reversible Diels-Alder adducts, self-assembly and self-repair or transport and storage capabilities. of energy, which can be used as thermoelectroactive materials, including heating panels and structures self-repairing by electricity.

Conductive nanocomposites crosslinked by thermally reversible bonds show potential thermomechanical reworking and stable electrical response, annealing ability by resistive heating, and behave like a thermoplastic when heated/pressed allowing recycling.

BRIEF DESCRIPTION OF THE FIGURES

FIGS. 4A-4C. Photograph of the conductive polyketone nanocomposite grafted with furanyl groups, cross-linked with multi-walled carbon nanotubes and bismaleimide added as a connected additive to the electrical circuit 4A and its thermal images before (FIG. 4B) and during the application of a voltage of 35 V (4C).

DETAILED DESCRIPTION OF THE INVENTION

Figures 1, 2, 3:
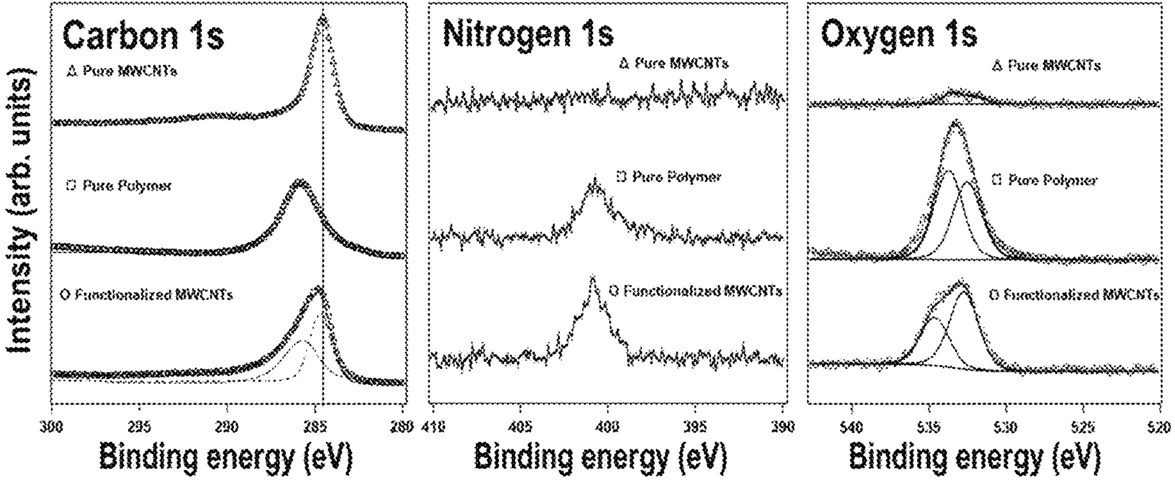
FIG. 1. Schematic representation of PK functionalized with furan (PK-Fu) or benzyl (PK-Bea) groups through the Paal-Knorr reaction.
FIG. 2. Functionalization of MWCNT with (A) PK-Fu (diene) and (B) bis-maleimide (dienophile) by Diels-Alder reaction.
FIG. 3. X-ray photoemission spectrum of the central level regions of CIs, NIs and Oís of MWCNTs functionalized with PK-Fu. Data and fit lines are displayed.

The present invention refers to cross-linked and recyclable nanocomposites that can be used as additive or matrix for the manufacture of materials, and that provide properties of thermostability, thermoreversibility, thermoadhesiveness, thermoconductivity, electroconductivity, self-repair, self-assembly, conversion of electricity into heat, or a combination of them. Said nanocomposites can be obtained by an in situ method by thermal treatment, from raw carbonaceous materials (Pure and Applied Optics 40 (2) 149-159 (2007)), including char, pitch, activated carbon, pyrolytic carbon, coke, graphite, organic material combustion residues, or selected from other carbonaceous materials comprising conductive structures, including graphite, graphene, carbon nanotubes including multi-walled carbon nanotubes and single-walled carbon nanotubes, fullerenes, or a combination of the themselves or their derivatives, and a polymer capable of reversibly dispersing and stabilizing said components, where said polymer has a viscous or fluid behavior below 200 °C, where said polymer is selected from a derivatized polymer with pendant groups that act as diene or dienophilic, preferably said derivatized polymer with pendant groups acting as diene or dienophilic is selected from furan functionalized aliphatic polyketones, furan functionalized polyesters, ethylene gum with propylene functionalized with furan groups or a combination thereof. The invention also relates to materials derived from these nanocomposites that import their unique inherent properties to give them properties of thermostability, thermoreversibility, thermosetting, thermoconductivity, electroconductivity, self-repair, self-assembly, conversion of electricity into heat, or a combination thereof. The invention also relates to a method of obtaining said nanocomposites, and their use as an additive or matrix thermosetting, thermoreversible, thermoadhesive, thermoconductive, electroconductive, self-repairing, converting electricity into heat, or a combination thereof.

In order to obtain viscosity and fluidity properties below 200 °C, said aliphatic polyketone is selected from low molecular weight polyketones, preferably with a carbon chain length greater than 50 carbons, preferably greater than 100 carbons, more preferably the carbon chain length is in the range of 100-500 carbons, even more preferably 120-200 carbons. Said aliphatic polyketone can also be selected from high molecular weight polyketones, preferably with molecular weights greater than 10,000 daltons, preferably greater than 50,000 daltons, even more preferably greater than 100,000 daltons, and even more preferably in the range of 50-500 thousand daltons, and even more preferably it is in the range between 100 to 200 thousand daltons. In these cases, the goal of viscosity and fluidity below 200 °C can be achieved by derivatization reactions with organic side groups, such as saturated and unsaturated alkyl groups, alcohols, amines, esters, ethers and polyethers, mercaptans, etc.

The nanocomposites of the present invention are cross-linked, thermoset and recyclable, they are conductive, thermally reversible, and present possibilities of thermomechanical reprocessing and stable electrical response; in addition, they behave like a thermoplastic when heated or pressed. Preferably they comprise viscous and fluid polymers below 200 °C, derivatized with diene and dienophilic groups that have characteristics of formation of reversible, easily processable thermoset polymers, including polyketones derivatized with pendant chemical groups that act as diene or dienophiles, capable of producing Reversible Diels-Alder reactions. Results obtained demonstrate the successful chemical modification of polyketone with a variety of functional chemical groups. In particular, the derivatization of polyketones with furanyl groups leads to polymers with the desired characteristics to link reversibly electrically conductive carbonaceous structures (FIG. 1).

These functional polymers, being viscous and fluid below 200 °C, show reversible properties, softening temperature, melting temperature and degradation temperature that provide a direct way to design adjustable thermosetting and self-healing nanocomposites. This allows the systematic formation of polymer molecular structures that optimizes the balance between the glass transition temperature and the melting temperature of the polymers based on the temperature necessary for crosslinking and subsequent opening of the thermosetting polymer during self-healing procedures with thermal energy. conventional or electric Joule effect.

From an applicative point of view, these functional polymers exhibit reversible properties, softening temperature, melting temperature, and degradation temperature that provide a direct way to design adjustable self-healing and thermosetting nanocomposites. This allows for systematically forming polymer molecular structures that optimize the balance between the glass transition temperature and the melting temperature of the polymers based on the temperature necessary for crosslinking and subsequent opening of the thermosetting polymer during self-healing procedures with conventional thermal energy. or electric Joule effect. Therefore, the intrinsic activation of self-healing, in particular the disconnection/reconnection of the Diels-Alder interactions makes it possible to systematically establish which molecular structure of the polymer with active Diels-Alder groups and the inherent properties with conductive carbonaceous structures and the fraction of volume that optimize the balance between the glass transition temperature and the melting temperature of the polymers and the heat energy necessary to cross-link and subsequently open the thermosetting nanocomposites during self-repair procedures. The latter is crucial to design fully self-healing thermoset nanocomposites taking into account the kinetics and energy levels for the crosslinking and opening reactions of the structurally damaged composite material, thus avoiding the need for higher energy levels for crosslinking and opening of the composite material that can degrade the material.

Figures 5A, 5B, 5C:
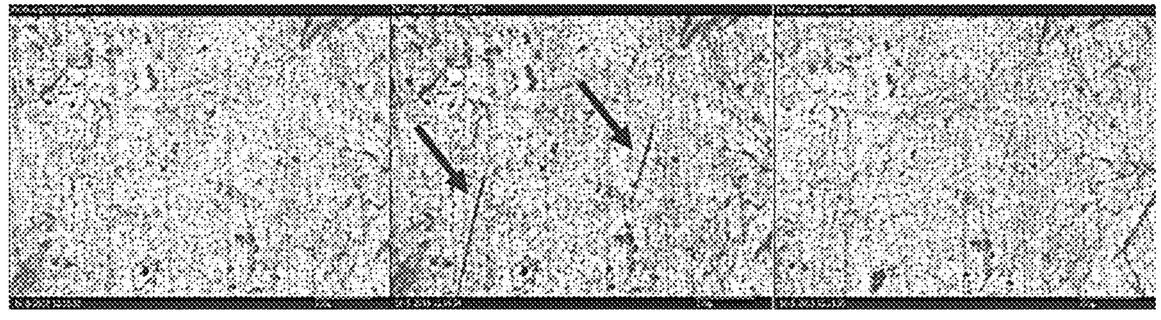
FIG. 5. Microscopic images of the conductive polyketone nanocomposite grafted with furanyl groups, crosslinked with multiwalled carbon nanotubes and bismaleimide added as an additive. Area examined undamaged (FIG. 5A), damaged (FIG. 5B) and self-repaired with electricity (FIG. 5C).

In a specific embodiment of the invention, mixing 5% by weight of carbon nanotubes with a polyketone functionalized with furanyl groups produces a conductive nanocomposite that exhibits thermal and electrically conductive properties (FIG. 2). X-ray spectroscopy analysis indicates that carbon nanotubes, due to their diene/dienophilic character, interact covalently with the matrix through the Diels-Alder reaction, leading to effective interfacial adhesion between the components (FIG. 3). The nanocomposite could be converted into a monolithic material with thermal and electrically conductive properties by compression and heating molding (FIG. 4A, for example). Additionally, the mechanical properties of monolithic materials could be strengthened by crosslinking the nanocomposite obtained by the Diels-Alder reaction with bis-maleimide added as an additive during molding processing. Thus, the softening point (tan (d) in dynamic mechanical analysis measurements) reaches up to 155 °C, producing a material with good mechanical characteristics. After grinding the composite material, compression molding (150 °C/4 MPa (40 bar)) activates the retro-Diels-Alder process that disassembles the web, allowing it to be reshaped as a thermoplastic. A subsequent process of annealing using resistive heating demonstrates the possibility of reconnecting the uncoupled Diels-Alder bonds, thus providing the nanocomposite with the properties of recyclability, reusability, and reprocessing in different ways, as well as the self-repair of cracks using electricity (FIG. 5).

On the other hand, as a test, an electrically activated thermoconductive monolithic material was manufactured from the functional nanocomposite obtained both using solvents and by mechanical mixing without solvents, drying, grinding, and subsequent compression molding. Once the material was connected to an electrical circuit, its usability to irradiate heat by resistive heating could be verified (FIGS. 4B and 4C).

Two thermoconductive monolithic materials were also prepared from the functional nanocomposite obtained both using solvents and by mechanical mixing without solvents, drying, grinding, and subsequent compression molding. Once both materials were in contact and by connecting each one to the ends of an electrical circuit, it was found that the two composite materials could be self-assembled to generate a single monolithic structure.

Figure 6:
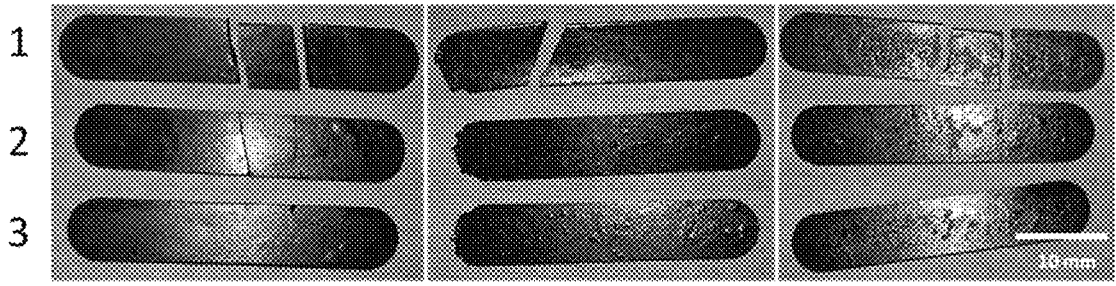
FIG. 6. Shows the self-repair of the nanocomposite with temperature using the Diels-Alder sequence. (1) torn, (2) self-healing front face (3) self-healing back face.

Two thermoconductive monolithic materials were also prepared from the functional nanocomposite obtained both using solvents and by mechanical mixing without solvents, drying, grinding, and subsequent compression molding. Once both materials were put in contact and heated in the oven to 150 °C, it was found that the two composite materials could be reprocessed, self-assembled and recycled to generate a single monolithic structure (FIG. 6).

Figure 7:
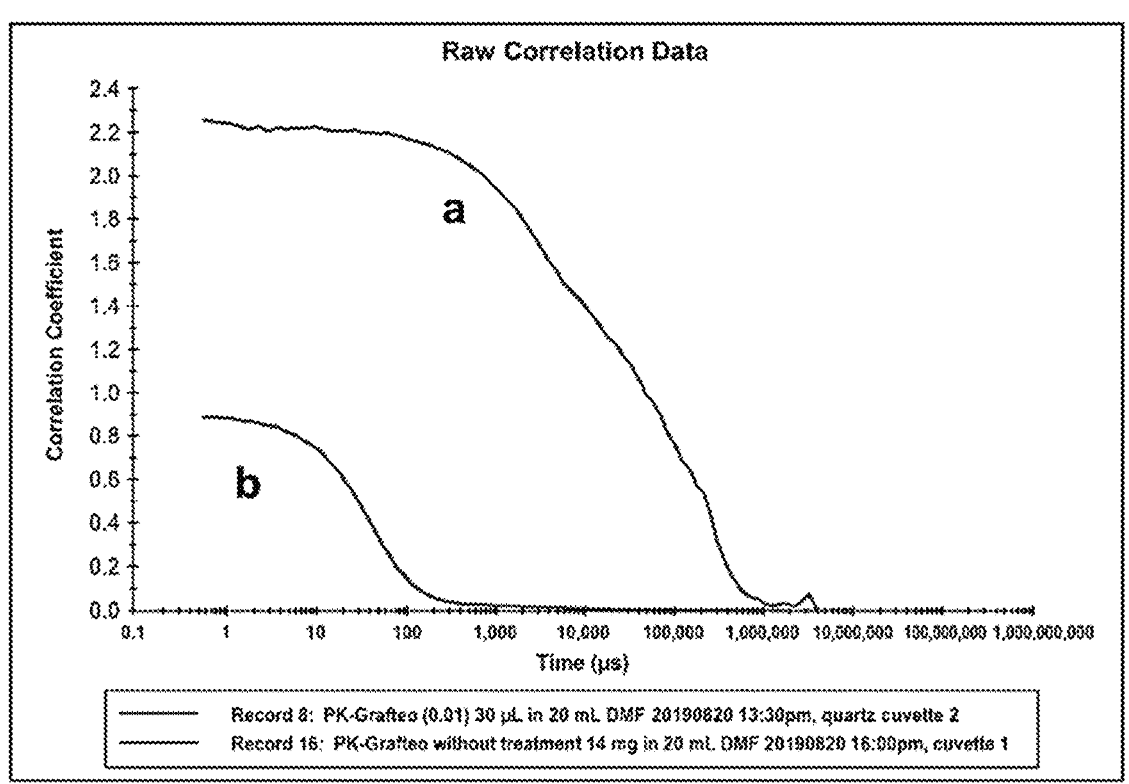
FIG. 7: Correlograms in DLS experiments of a suspension of the polymer with graphite microparticles (a) graphite particles of micrometer size and in red the decrease in the size of the graphite particles to nanometric size after the exfoliation treatment with modified polyketone.

In another specific embodiment of the invention, when heating a derivatized polymer with furanyl groups mixed with graphite microparticles (20 μm), the exfoliation of graphite in graphene-like nanostructures (200 nm) occurs (FIG. 7), and, after an after-cooling, a nanocomposite is produced that shows very good dispersion and stabilization of graphene-type nanostructures. This is inferred with the naked eye by the lack of precipitation of the graphite powder and, analytically, by verifying the presence of nano-sized structures in the mixture by the dynamic light scattering (DLS) technique (FIG. 7). The resulting material exhibited good electron conducting properties. A stable and homogeneous powder mixture of the resulting nanocomposite was subsequently obtained, suggesting that the polymeric matrix has a strong exfoliating effect on the graphite filler, an outstanding characteristic that allows graphene nanostructures to be exfoliated in situ from bulk graphite and its subsequent use. in the manufacture of functional materials.

Figure 8:
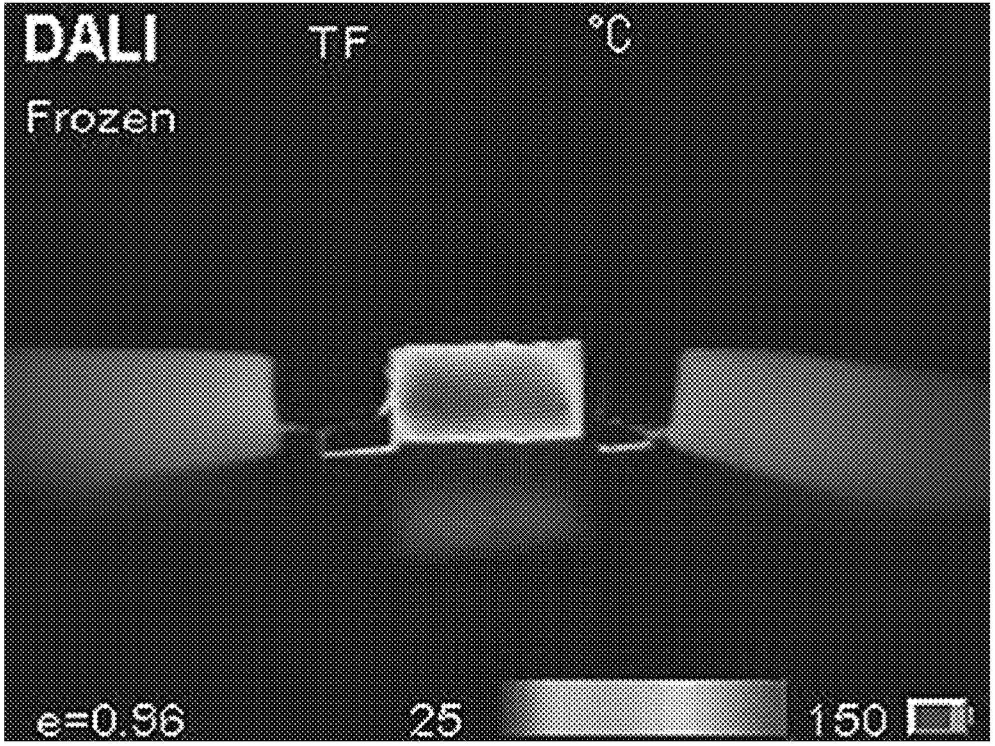
FIG. 8. Photograph of derivatized polyketone/graphene-like carbonaceous nanostructures after compression molding and connected to electricity generating 150 °C.

Additionally, an electrically activated thermoconductive monolithic material was obtained from the functional nanocomposite obtained both using solvents and by mechanical mixing without solvents, drying, grinding, and subsequent compression molding. Once the material was connected to an electrical circuit, its usability to irradiate heat by resistive heating could be verified (FIG. 8).

Two thermoconductive monolithic materials were also prepared from the functional nanocomposite obtained both using solvents and by mechanical mixing without solvents, drying, grinding, and subsequent compression molding. Once both materials were in contact and by connecting each one to the ends of an electrical circuit, it was found that the two composite materials could be self-assembled to generate a single monolithic structure.

Figure 9:
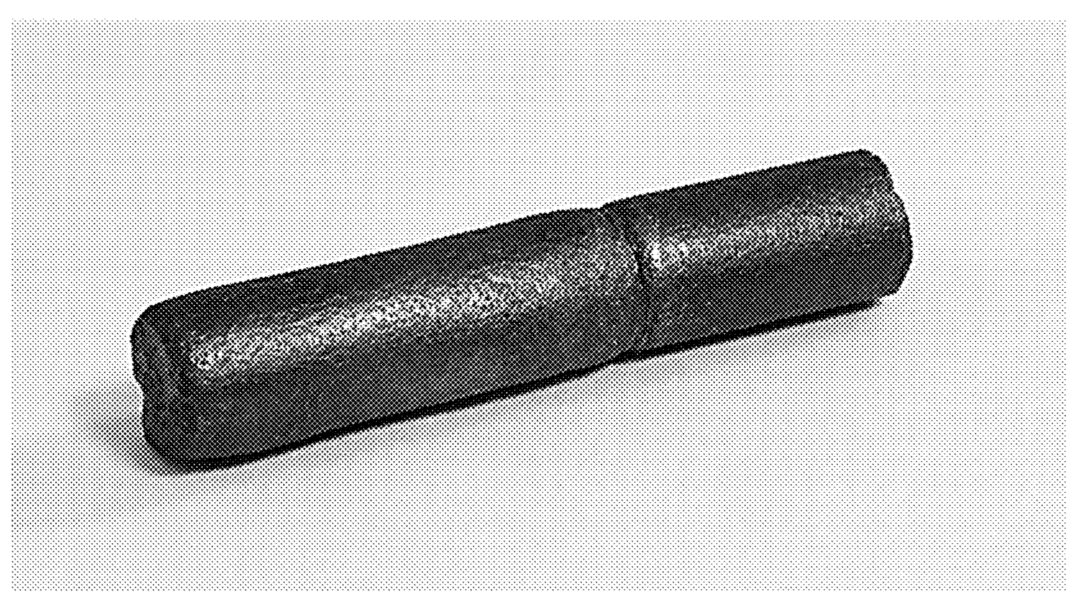
FIG. 9. Photograph of two derivatized polyketone monolithic nanocomposites/graphene-like carbonaceous nanostructures after self-assembling in an oven at 150 °C.

Two thermoconductive monolithic materials were also prepared from the functional nanocomposite obtained both using solvents and by mechanical mixing without solvents, drying, grinding, and subsequent compression molding. Once both materials were brought into contact and heated in the oven to 150 °C, it was found that the two composite materials could be self-assembled to generate a single monolithic structure (FIG. 9).

Figures 10A, 10B:
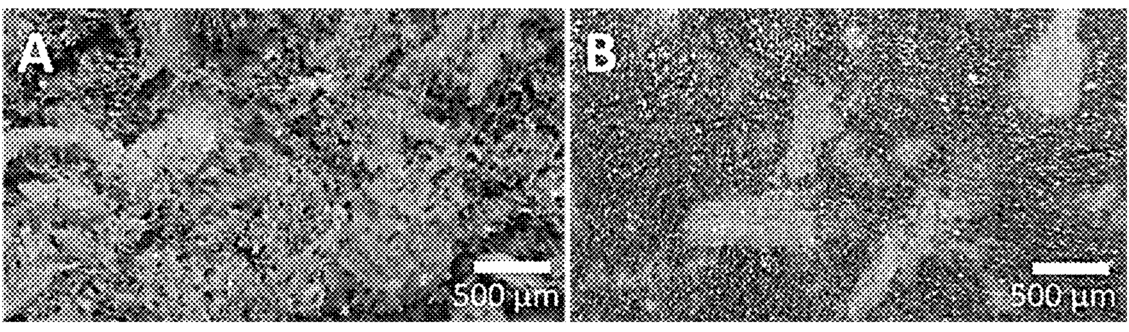
FIGS. 10A and 10B: Imaging of polymer with nano-sized graphite particles before compression molding with sawdust (FIG. 10A) and after compression molding with sawdust (FIG. 10B).

Likewise, a monolithic material was obtained by mixing the functional nanocomposite obtained and sawdust particles, both using solvents, as well as mechanical mixing without solvents and powder mixing, drying, grinding, and subsequent compression molding. The resulting material is a wood-filled composite that conducts electricity (FIGS. 10A and 10B)

Figure 11:
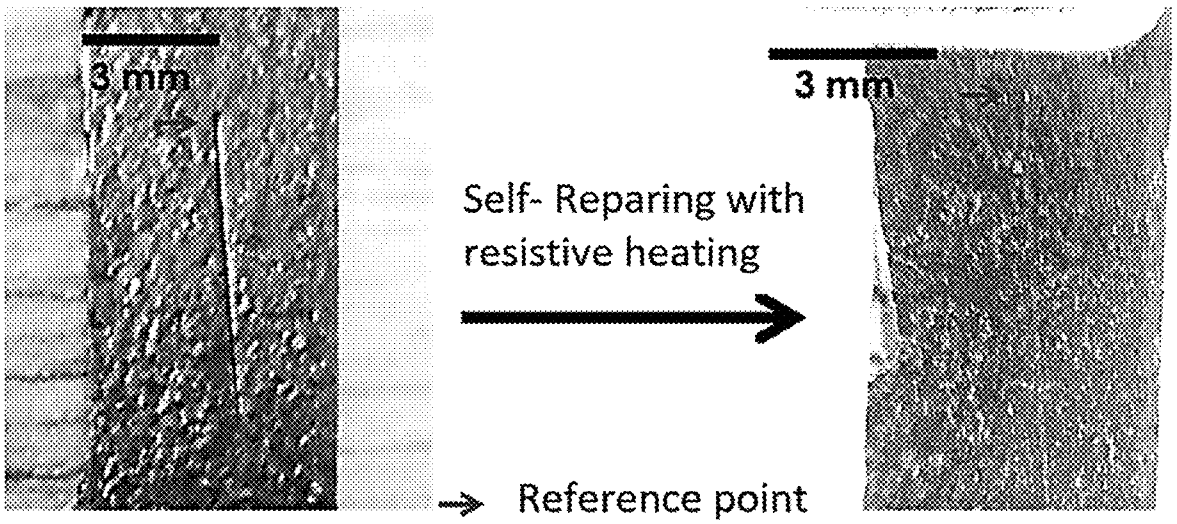
FIG. 11. Photograph of derivatized polyketone/graphene-like carbonaceous nanostructures after compression molding and connected to electricity generating 150 °C and showing self-repair of a surface crack.

Additionally, an electrically self-repairing monolithic material was prepared from the functional nanocomposite obtained, both using solvents and by mechanical mixing without solvents, drying, grinding, and subsequent compression molding. A mechanical crack was made in the material and, once it is connected to an electrical circuit, it was found that the material heats up, softens locally and self-repairs the mechanical damage (FIG. 11).

Likewise, an additive was prepared from the functional nanocomposite obtained, which, mixed with asphalt bitumen, both using solvents and mechanical mixing without solvents, drying, grinding, and subsequent compression molding, was characterized by rheology, determining an increase between 6 to 8 times the rheological properties of bitumen asphalt (FIG. 12).

In all these cases, because the covalent interaction between the derivatized polymers with diene or dienophilic groups, preferably modified polyketone, and the electrically conductive carbonaceous nanostructures is reversible, the resulting system could be subjected to such a temperature (150 °C) that allows the separation of the components, either by conventional caloric stimulation or resistive heating by electricity. In an event of structural damage, the material could be self-healing or two composite materials of the same or different material could be self-assembled to generate a single structure. For the same reason, the nanocomposites of the present invention offer recycling properties by conventional heat stimulation or electrical by resistive heating.

Regarding the self-repair mechanism, it would operate in the following way, without adhering to any theory: electrically induced self-repair occurs through the generation of nanoscopic heat when an electric current passes through the nanostructured conductive network of conductive carbonaceous materials. This resistive heating activates the intrinsic self-healing ability of the thermally self-healing polymer matrix to repair damage in local areas. The chemical pathway used for thermal self-repair is Diels-Alder reversible cycloaddition. This allows for bond breaking, molecular movements, and reconnection of matrix molecules and carbonaceous structures through retro-Diels-Alder and Diels-Alder reactions, respectively, and therefore regeneration of three-dimensional network structures.

In a specific embodiment of the invention, the activation of resistive heating using electricity in the presence of macroscale damage (i.e. cuts), generates local changes in electrical resistivity in the crack and leading to a local increase in temperature, within of the temperature range of the retro-Diels-Alder reaction. Said temperature generates the opening of the cross-linked network of the polimeric matrix to in turn generate enough mobility in the polymeric chains to close and seal the cut through the Diels-Alder reaction when cooling.

In a specific embodiment of the invention, the method of preparing the nanocomposites comprises the following steps:

a) functionalizing a polymer with pendant groups that act as diene or dienophilic, where preferably said polymer is selected from an aliphatic polyketone, and said functionalization carried out carried out by means of a Paal-Knorr reaction between said aliphatic polyketone and primary amines containing said diene or dienophilic groups, preferably, but not limited to, furfurylamine, being the molar ratio between the dicarbonyl groups of said aliphatic polyketone, where said primary amine allows conversion percentages between 1 and 100%, preferably in the range of 20-90%, more preferably in the range of 40-85%, more preferably in the range of 60-80%, the molar proportion of groups being then Aliphatic polyketone diketone and furfurylamine in the range of 1 and 100%, preferably in the range of 20-90%, more preferably in the range of 40-85%, more preferably in the range of 60-80%. The reaction is carried out at temperatures between 50 and 200 °C, preferably at 100 °C in the absence of solvent, or alternatively using at least one solvent, which can be selected from saturated or unsaturated aliphatic or alicyclic hydrocarbon, a hydrocarbon aromatic, an alcohol preferably comprising at least 3 carbon atoms, a glycol, a halogenated hydrocarbon, a ketone, an ester, an ether or a glycol ether, or a mixture of two or more thereof, preferably selected from tetrahydrofuran (THF), acetonitrile, N-methyl-2-pyrrolidone (NMP), dimethylformamide (DMF), 2 propanol, 1 propanol, toluene, benzene, chlorobenzene 1,2-dichlorobenzene, still preferably 1 propanol;

b) optionally, additional derivatizations of the polyketones with organic side groups, including saturated and unsaturated alkyl groups, alcohols, amines, esters, ethers and polyethers, mercaptans, can be carried out under the same methodology of step a), in order to modulate the temperatures glass transition, melting temperature or both below 200 °C in order to give the polymers the desired viscosity and fluidity.

c) mixing the functionalized polymer obtained in step a) with a carbonaceous material selected from raw carbonaceous materials comprising electrically conductive carbonaceous materials including carbon, pitch, activated carbon, pyrolytic carbon, coke, graphite, combustion residues of organic material, or Electrically conductive carbonaceous materials selected from graphite, graphene, and carbon nanotubes, including single or multiple walled carbon nanotubes, fullerenes, or a combination thereof or their derivatives, where said mixing is carried out at temperatures above the melting temperature of the polymer until the establishment of the retro-Diels Alder reaction preferably, including in the temperature range between 20 and 200 °C, preferably between 40 and 120 °C, in the absence of solvent, or alternatively in the presence of a solvent selected from water or organic solvents such as saturated or unsaturated aliphatic or alicyclic hydrocarbon, an aromatic hydrocarbon, an alcohol preferably comprising at least 3 carbon atoms, a glycol, a halogenated hydrocarbon, a ketone, an ester, an ether or a glycol ether, or a mixture of two or more thereof, preferably selected from tetrahydrofuran (THF), acetonitrile, N-methyl-2-pyrrolidone (NMP), dimethylformamide (DMF), 2 propanol, 1 propanol, toluene, benzene, chlorobenzene 1,2-dichlorobenzene, where the proportion of derivatized polymer with pendant groups acting as furan functionalized diene or dienophile, where the proportion by weight of furan and carbonaceous materials is in the range 10%: 90%-99.9%: 0.1%, preferably 80%: 20%-99.9%: 0.1%, and the volume of solvent in the range of 90%-10% in ml, preferably in the range of 50%-10% in ml;

d) optionally, over the hot reaction mixture, additives, including crosslinkers comprising one of bis-maleimide, maleic anhydride, maleic imide, benzoquinone, alkyne, alkene, cellulose fibres, inorganic particles, metal salts, salts of lithium, copper salts, metal oxides including titanium oxides, zinc oxide, copper oxide, metal nanoparticles including gold and silver nanoparticles, metals, polymeric materials to manufacture advanced materials with various properties;

e) optionally separating the non-conductive residues from the crude carbonaceous materials by precipitation, centrifugation, filtration, or other conventional methods;

f) cooling the mixture, optionally grinding the nanocomposite, and storing, and optionally using it to shape it by techniques including compression molding, injection, supercritical fluid treatment, where such shapes include powder, prism, monolith, sheet, sponge, airgel.

Examples illustrating the present invention, without limiting it, are provided below, the technical embodiments being equivalent to these examples, contained within the spirit and scope of the invention. The following examples then seek to allow the understanding of the invention, without restricting its scope, and in particular, to comprise a preferred embodiment for obtaining polyketone derivatized with furanyl groups, obtaining nanocomposites of polyketone derivatized with furanyl groups and carbon nanotubes, Obtaining derivatized polyketone nanocomposites with furanyl groups, carbon nanotubes and the bismaleimide additive, obtaining nanocomposites of polyketone derivatized with furanyl groups and exfoliated graphite in situ in graphite nanostructures, and their advantageous properties, and possible applications with different additives and their forms.

EXAMPLES

Example 1: Functionalization of Polyketone with Furan Groups

The reaction between polyketone (PK) and furfurylamine (Fu) was carried out in bulk by the Paal-Knorr reaction. The polyketone functionalized with furan groups (PK-Fu) (FIG. 1) was made without solvent according to the molar ratio between the 1,4-di-carbonyl groups of polyketone and furfurylamine. In particular, the synthesis of PK-Fu was carried out in a 250 ml sealed round bottom glass reactor with a reflux condenser, a U type anchor impeller and an oil bath for heating. After preheating 10 g of PK to a liquid state at 100 °C, furfurylamine was added to the reactor. The stirring speed was set at 600 rpm and the reaction time was set at 4 h. The resulting polymers were washed 3 times with Milli-Q water to remove any unreacted furfurylamine. Subsequently, the remaining water was removed under vacuum in a lyophilizer for 72 h.

The summary of the experimental results is shown in Table 1

TABLE 1

Experimental results of PK modified with furfurylamine (PK-Fu).

| Run | $C_{co}$(%) [a] | $T_g$(° C.) [b] | PDI [c] |
|---|---|---|---|
| PK-Fu | 74 | 31 | 2.3 |

[a] carbonyl conversion;
[b] glass transition temperature,
[c] polydispersity index.

The characterization of PK-Fu by means of $^1$H NMR spectroscopy of the polymer indicates the presence of protons attributed to the $CH_2$ groups between the pyrrole and furan groups at 4.9 ppm, the one related to the pyrrole group at 5.8 ppm and the Proton signals from the furan residues at 5.9, 6.2 and 7.3 ppm. FT-IR spectroscopy of the same sample shown indicates the presence of bands of CH bonds related to heterocyclic groups around 3150-3115 $cm^{-1}$ (pyrrole and furan groups), the band of C═O bonds of groups carbonyl at 1707 $cm^{-1}$, the C═C bond band of heterocyclic groups at 1507 $cm^{-1}$, the C—N bond bands of the pyrrole group are observed at 1345 $cm^{-1}$, the C—O—C bond bands of the furan group are observed at 1073 $cm^{-1}$ and, finally, the C—H bond band out of plane of the furan ring at 735 $cm^{-1}$.

The glass transition temperature of PK-Fu (Tg) was measured by DSC (Table 1) and reaches a value of 31 °C. The polydispersity of PK-Fu was determined by GPC (Table 1) showing characteristics of secondary standard.

The carbonyl conversion (Cco) indicates the percentages of furan groups grafted on the polyketone (Table 1).

Example 2: Nanocomposite Formation Between Carbon Nanotubes (MWCNT) and Aliphatic Polyketone Derivatized with Furan Groups In a round bottom flask 0.95 g of PK-Fu was weighed which was dissolved in 5 ml of NMP (N-methyl-2-pyrrolidone) and added to 0.05 g of MWCNT. The reaction was stirred vigorously at 50 °C for 24 h using an oil bath equipped with a temperature controller. The reaction mixture was repeatedly washed with THF and filtered to recover the added MWCNTs with PK-Fu (see recovered product in Table 2). The remaining solvent was removed in vacuo at 50 °C for 48 h.

TABLE 2

Experimental results for the functionalization of MWCNT with PK-Fu.

| Sample | N Content (%) | Aggregate (%)[a] |
|---|---|---|
| MWCNT/PK-Fu | 2.45 | 34 |

[a]The amount of PK-Fu (%) on the surface of the MWCNT is estimated by elemental analysis according to the nitrogen content (N)).

FIG. 2 schematically shows the reaction between MWCNT and PK-Fu. An XPS analysis of PK-Fu functionalized MWCNTs clearly confirmed the effectiveness of the DA graft mechanism (FIG. 3). In the carbon 1 spectra, the main peak can be identified at 284.5 eV, accompanied by the shaking characteristic at approximately 6.0 eV of highest binding energy characteristic of the conjugated systems π-π, which would fit perfectly with C $Sp^2$. On the other hand, the C1s spectrum of the pure polymer shows a broad characteristic that peaked at 286.0 eV and that results from three components, that is, C— C $Sp^2$, —$CH_2$—$CH_3$ $sp^a$ and $CH_2$—C—$CH_3$. The spectrum for pure PK-Fu also shows 01 components attributed to O═C at 532.4 eV and O—C at 533.8 eV, as well as a peak of N1s at 401.5 eV. For the nanocomposite from PK-Fu to MWCNTs, the presence of the polymer would be evident from the intensities of N1 and 01, but it could also be clearly confirmed in the carbon spectra. In the 01s spectrum, the results of the OC component shifted by 1 eV to a higher binding energy, which would clearly point to a charge redistribution resulting from the fixation of furan on the MWCNT surface, from which it would be possible to conclude—from the C1s spectrum, that the functionalization of the side wall of MWCNTs with PK-Fu would be carried out through the C—C bond.

Raman spectroscopy analyses of pristine MWCNTs and the nanocomposite show the G band, which testifies to the graphical crystalline arrangement (1580 $cm^{-1}$), the defect-related D band (1345 $cm^{-1}$) and the overtone of the D band, G' band, are indicative of multi-walled structures (2684 $cm^{-1}$). The band centered at 2995 $cm^{-1}$ (CH vibration of alkanes) is only detected in the presence of the polymer. The intensity ratio between the D and G bands decreases from 1.49 for pristine MWNTs to 1.29 for PK-Fu functionalized MWCNTs. Then, after the cycloaddition step, the subsequent rehybridization would restore the $Sp^2$ state, recovering the aromaticity of the system in the defective region of the MWCNTs. The highly defective graphene layers can also be followed by key analysis of the intensity relationship between the G' and D bands, increasing from 0.17 for pristine MWCNTs to 0.27 for the less entangled PK-Fu functionalized MWCNTs. In summary, although PK-Fu modifies the graphical surface of MWCNTs, its presence would enhance the long-range graphical order of pristine MWCNTs.

Figure 13:
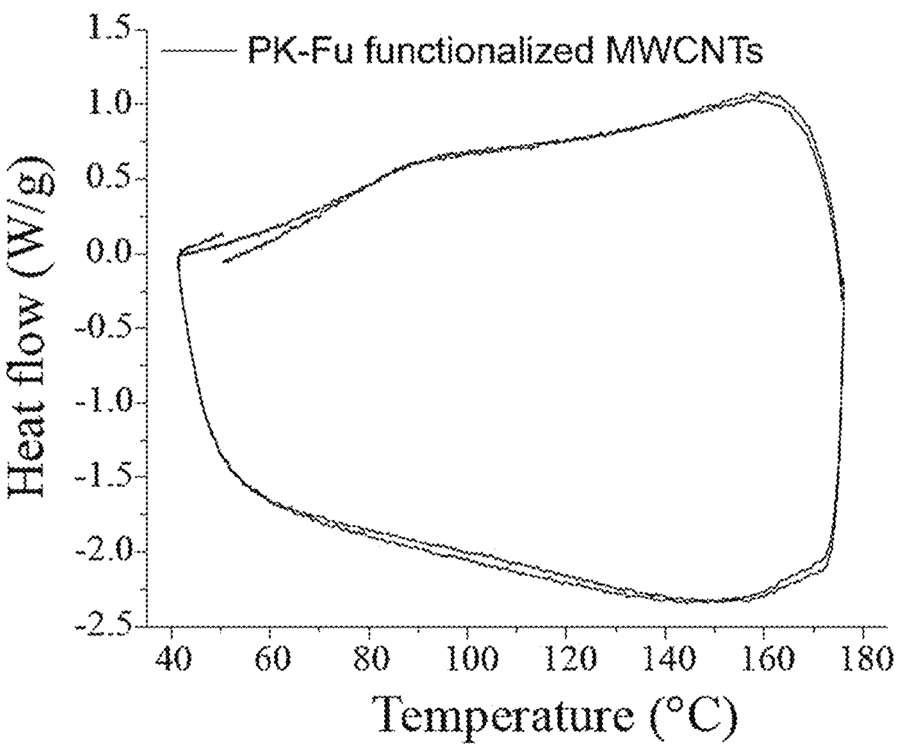
FIG. 13. DCS thermal cycling of the polyketone nanocomposite derivatized with furanyl groups (PK-Fu) and multi-walled carbon nanotubes (MWCNT).

The DSC analysis of the PK-Fu nanocomposite (FIG. 13) shows two endothermic transitions: around 75-80 °C, associated with the glass transition of the material, and the second from 120 to 170 °C, centred at 160 °C and associated to the retro-DA reaction. The energy required for the retro-DA process reaches 11.6 J/g, a value that perfectly correlates with the energy associated with the retro-DA reaction for conventional thermally reversible crosslinked furan/maleimide systems. In this way, the MWCNT/PK-Fu represents a consistent example of a reversible graft between an electrically conductive graphite material and a polymer matrix.

Example 3: Reinforcement of the Nanocomposite with Bis-Maleimide Crosslinker

The thermosetting nanocomposite with the bis-maleimide crosslinker was prepared by mixing the product from Example 2 and equimolar amounts of PK-Fu and bismaleimide using THF as solvent (10% by weight) in a 150 ml round bottom flask. equipped with a magnetic stirrer. The reaction mixture was heated at 50 °C for 24 h to form the cross-linked network under reflux. After the reaction, the solvent was removed in vacuo at 50 °C overnight. The resulting powder was divided into small portions of approx. 500 mg which were cast into rectangular bars at 150 °C for 30 minutes at a pressure of 4 MPa (40 bar).

Figure 14:
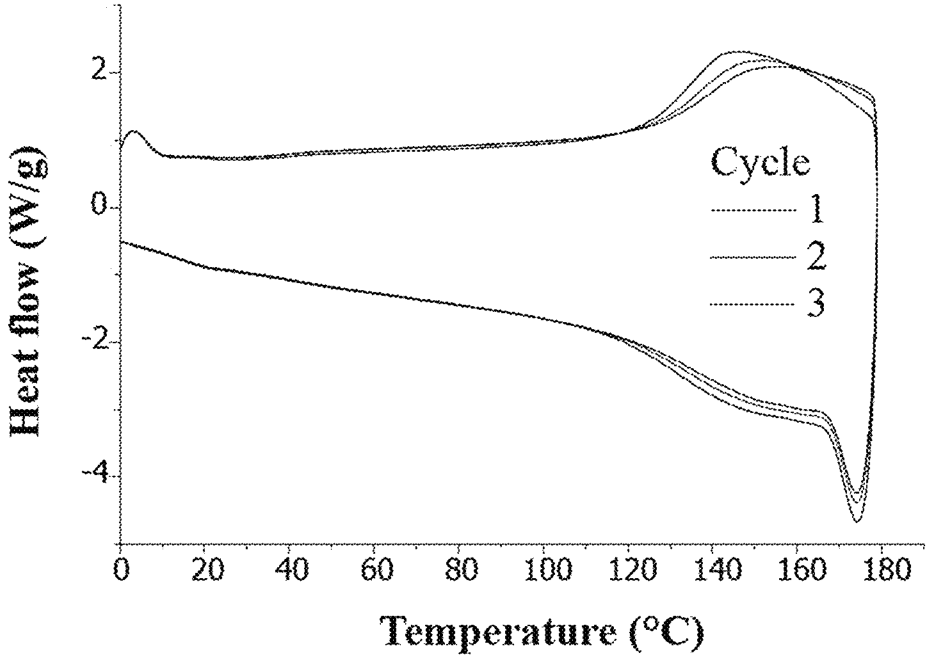
FIG. 14. DSC thermal cycling of the polyketone nanocomposite derivatized with furanyl groups (PK-Fu) and multi-walled carbon nanotubes (MWCNT) reinforced with the additive bismaleimide (B-Ma).

The MWCNT/PK-Fu nanocomposite was further crosslinked with B-Ma through a reversible Diels-Alder reaction and characterized by DSC (FIG. 14). The thermograms show a wide endothermic transition in the temperature range between 120 °C and 180 °C for each consecutive thermal cycle, corroborating the reworkable nature of the nanocomposite reinforced with the bismaleimide additive.

Figure 15:
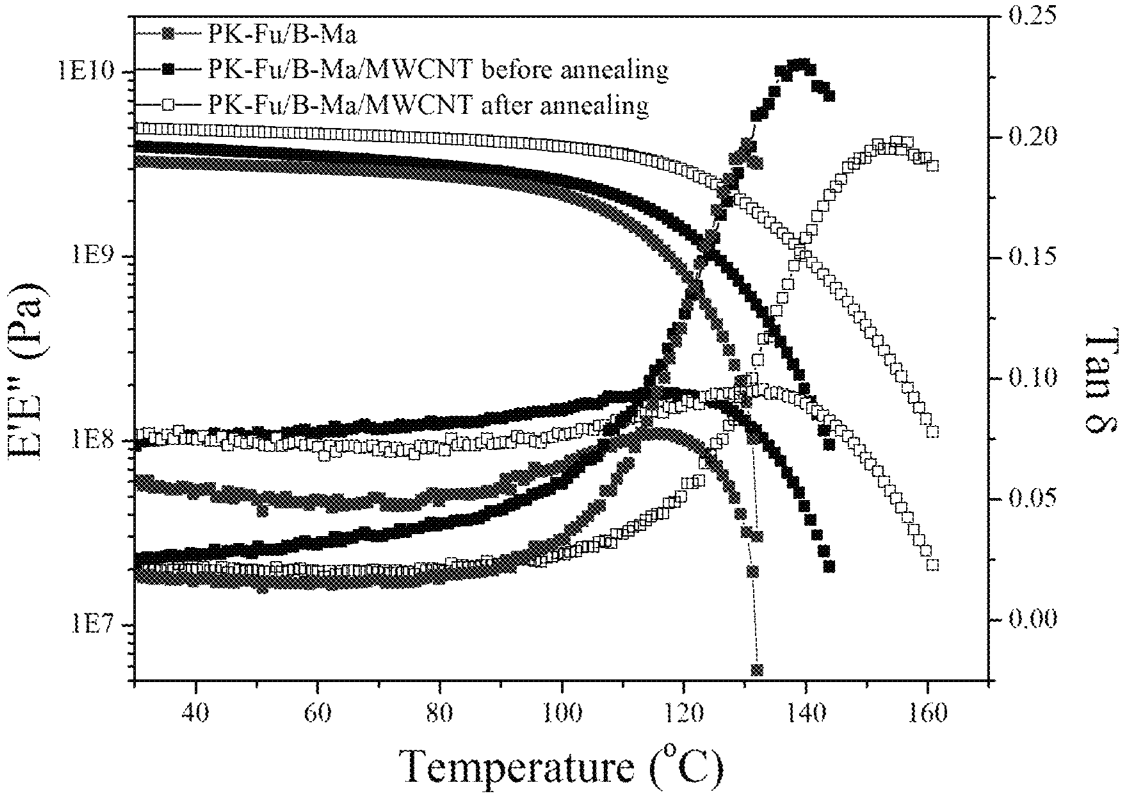
FIG. 15. DMTA of a polyketone nanocomposite derivatized with furanyl groups (PK-Fu) and multi-walled carbon nanotubes (MWCNT) reinforced with the additive bismaleimide (B-Ma) and its annealing by resistive heating for 24 h with 35 V.

The DMTA analysis carried out on rectangular bars of the nanocomposite reinforced with the bismaleimide additive shows excellent properties of the softening point (peak in tan (6)), loss moduli and elastic properties (FIG. 15).

In particular, the softening point (tan (6)) is 140 °C for the nanocomposite, which, after being subjected to resistive heating, increased to approx. 155 °C which would lead to a higher crosslinking density of the nanocomposite during resistive heating, without adhering to any theory. Elastic modulus (E') and softening temperature (tan (6)) improve significantly after resistive heating for 24 h at 35 V.

Figure 16:
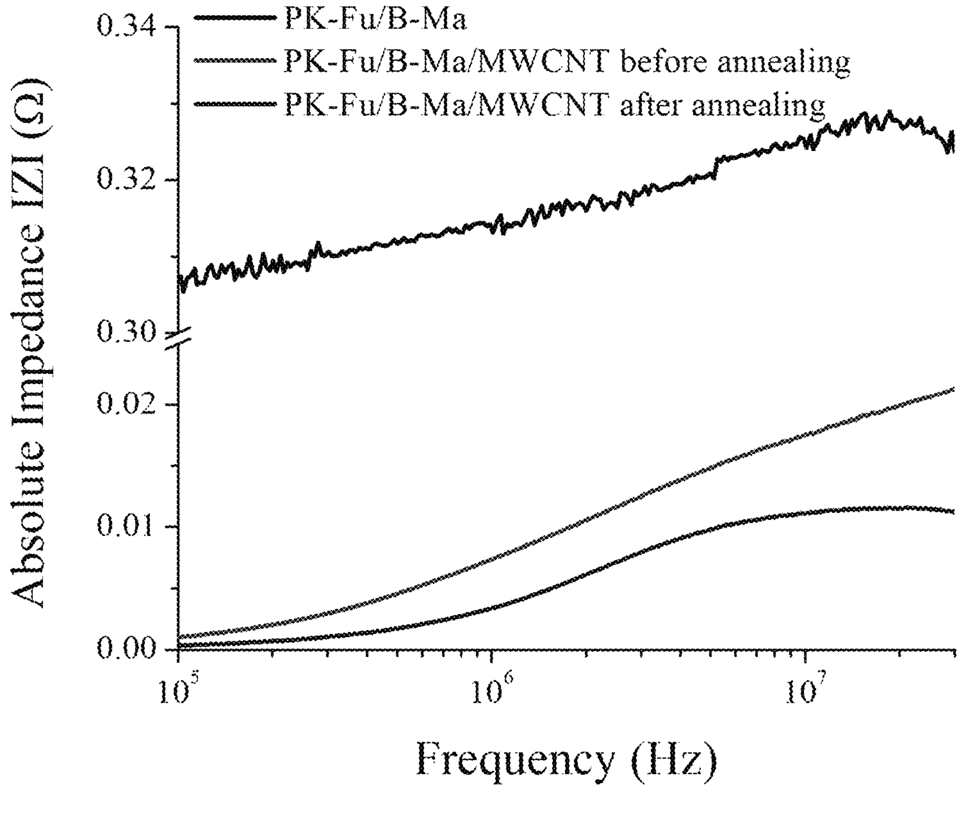
FIG. 16. Variation of the absolute impedance of the polyketone nanocomposite derivatized with furanyl groups (PK-Fu) and multi-walled carbon nanotubes (MWCNT) reinforced with the additive bismaleimide (B-Ma) and its annealing by resistive heating for 24 h with 35 V.

FIG. 16 indicates that the impedance (that is, the total resistance of the material) of the nanocomposite reinforced with the bismaleimide additive reduces its impedance by half and becomes more electrically conductive with annealing, without adhering to any theory. SEM micrographs show the newly broken surfaces of the composite material after molding.

Figure 17:
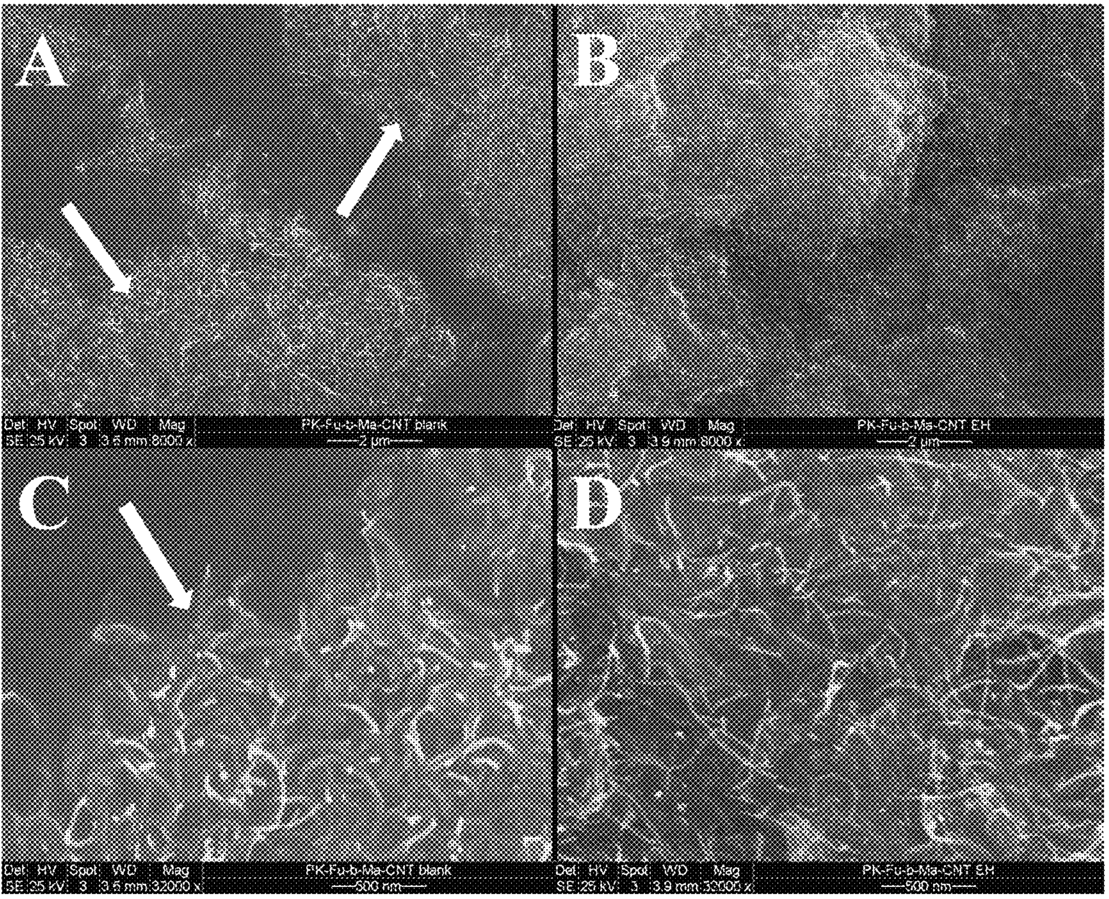
FIG. 17. SEM micrographs of the polyketone nanocomposite derivatized with furanyl groups (PK-Fu) and multi-walled carbon nanotubes (MWCNT) reinforced with the bismaleimide additive (B-Ma) after molding (A, C) and after annealed by resistive heating (B, D).

(FIG. 17, arrows A and C), beams of MWCNT can be observed (indicated by white arrows). After resistive heating (FIG. 17, arrows B and D), the MWCNTs are better distributed, confirming the ability of electric current to restore a more effective percolative network to conduct electricity.

Example 4: Formation of Nanocomposites with Exfoliation of Graphite in Graphene Particles In another specific embodiment of the invention, heating a polymer derivatized with furanyl groups at 70 °C produces a viscous mixing with graphite microparticles (20 μm) with a mass ratio of 80% polymer and 20% graphite in a conventional reactor provided with a mechanical mixer with adjustable speed. During mixing, the exfoliation of the 20 μm graphite occurs in graphene-like nanostructures, obtaining particle sizes of 200 nm. The exfoliation of the graphite occurs due to the anchoring of the furanyl groups of the polyketone on the graphite structure of the graphite with micrometer size through the Diels-Alder reaction and, by means of shear force in the conventional reactor, the polyketone releases sheets graffiti in a continuous process transforming the micrometric graffiti structure into another nano-sized graffiti structure. After subsequent cooling to room temperature, a composite matrix is produced that shows very good dispersion and stabilization of graphene-like nanostructures. The mixture exfoliated through the shear Diels-Alder reaction is then subjected to the retro-Diels-Alder reaction at 150 °C in N, N-dimethylformamide as solvent to separate the graphene-like structures from the polyketone. Once the separation process has been carried out, the exfoliation of the graphite is inferred with the naked eye by the lack of precipitation of the graphite powder and, analytically, by verifying the presence of nano-sized structures in the mixture by the light scattering technique. dynamic (DLS) (FIG. 7). The sequential process of Dials-Alder chemical anchoring of the polymer to the graphite microstructure, the exfoliation of the graphite in graphene structures and subsequent de-anchoring of the polymer from the exfoliated structure through the retro-Diels-Alder reaction, can be developed continuously to continue with the exfoliation of the resulting graphene-type nanostructures in order to obtain graphene sheets.

In this way, it is shown that the polymeric matrix has a strong exfoliating effect on the filling of graphite, and endorses the ability of polyketone as a useful agent to exfoliate graphene nanostructures in situ from bulk graphite and its subsequent use in the manufacture of functional materials.

Example 5: Preparation of a First Thermoconductive Monolithic Material

A monolithic thermoconductive material activated by electricity was obtained from the functional nanocomposite obtained in example 4, both using solvents with a solute mass of 10% of the functional nanocomposite obtained in example 4, and by mechanical mixing without solvents, drying, grinding, and subsequent compression molding at 150 °C and 4 MPa. Once the material was connected to a 25 Volt electrical circuit, its usability to irradiate heat by resistive heating could be verified (FIG. 8).

Example 6: Preparation of a Second Thermoconductive Monolithic Material

A thermoconductive monolithic material was obtained from the functional nanocomposite obtained in example 3, both using solvents with a mass of 10% of the solute, as well as by mechanical mixing without solvents at 70 °C, drying, grinding, and subsequent compression molding at 150 °C and 4 MPa. Once the compound is broken, the pieces are put in contact and activated with temperature to achieve the retro-Diels-Alder reaction sequence using 150 °C to achieve the meeting of the material and subsequent annealing at 50 °C to achieve chemical self-repair. by the Diels-Alder reaction. It was found that the pieces of composite materials could be self-assembled to generate a single self-repairing monolithic structure (FIG. 6).

Example 7: Preparation of Monolithic Material with Wood Filler

A monolithic material was obtained by mixing the functional nanocomposite obtained in Example 4 with a mass of 20% and sawdust particles with a mass of 80%, in a conventional reactor equipped with a mechanical mixer with adjustable speed at 70 °C, both using solvents with a 50% solute mass, as well as mechanical mixing without solvents and powder mixing without temperature, drying, grinding, and subsequent compression molding at 150 °C and 4 MPa. The resulting material is a wood-filled composite that conducts electricity (FIGS. 10A and 10B).

Example 8. Preparation of Monolithic Material, Self-Repairing with Electricity

A monolithic material self-repairing with electricity was obtained from the functional nanocomposite obtained in example 3 and example 4, both using solvents with a mass of 10% solute, and by mechanical mixing without solvents at 70 °C, drying, grinding, and subsequent compression molding. A mechanical crack was made in the material and, once it is connected to a 25 Volt electrical circuit, it was verified that the material heats up, softens locally and self-repairs the mechanical damage (FIG. 5A, 5B, 5C and FIG. 11).

Example 9. Preparation of Functional Nanocompound Additive

Figures 12A, 12B:
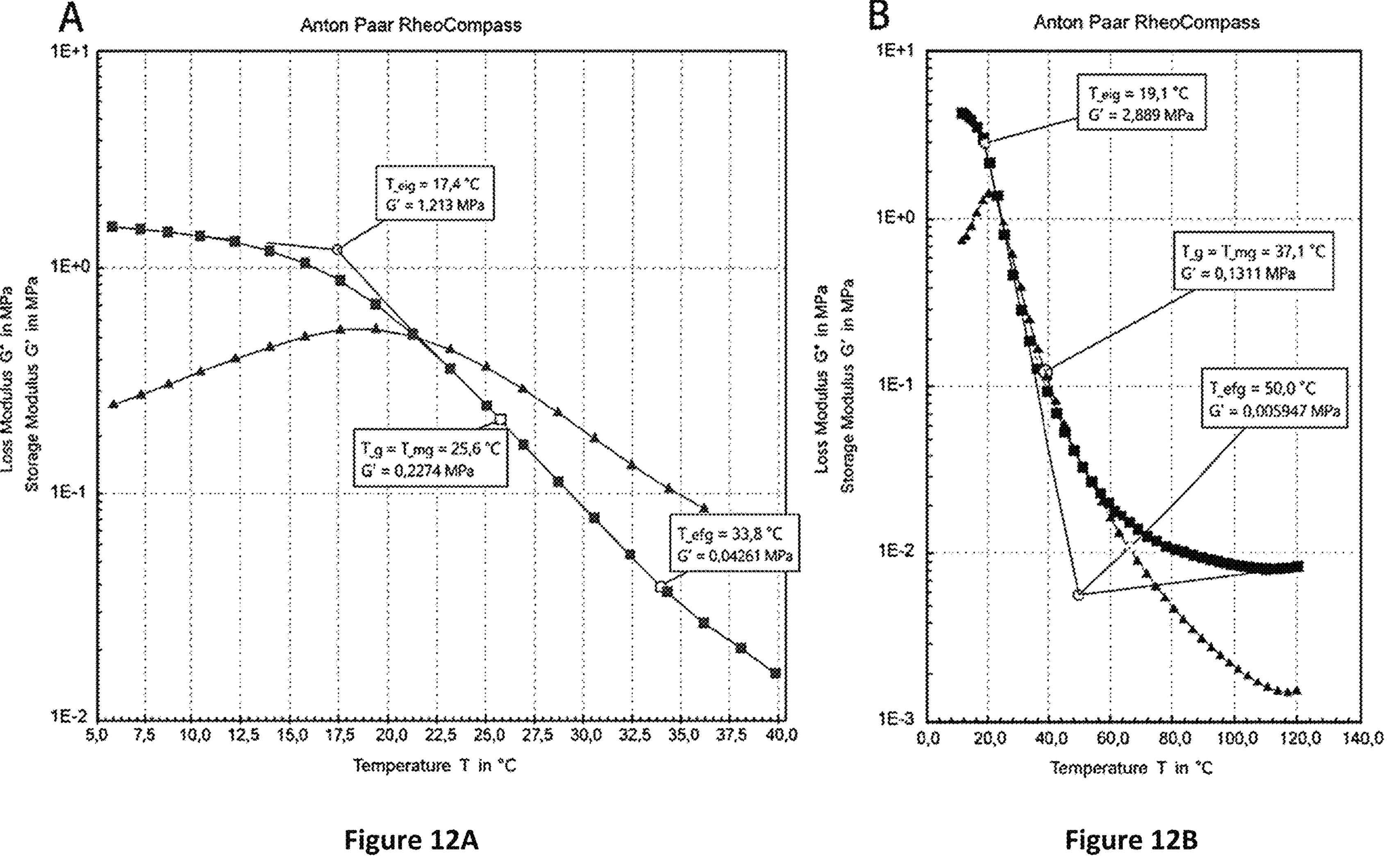
FIGS. 12A and 12B. Viscoelastic behavior of asphalt bitumen (FIG. 12A) and derivatized polyketone/graphene-like nanostructures after mixing with asphalt bitumen and compression molding showing rheological properties superior to bitumen alone (FIG. 12B).

An additive was obtained from the functional nanocomposite obtained in example 4 with a mass of 20%, which, mixed with asphalt bitumen with a mass of 80%, both using solvents with 10% solute and by mechanical mixing without solvents at 70 °C, drying, grinding, and subsequent compression molding at 150 °C and 4 MPa, was characterized by rheology, determining an increase between 6 to 8 times the rheological properties of bitumen asphalt (FIGS. 12A and 12B).

The invention claimed is:

1. Cross-linked and recyclable nanocomposites, comprising:

a graphite material of a macrometric, micrometric, or nanometric size;

at least one additional component of a macrometric, micrometric, or nanometric size, the at least one additional component being selected from the group consisting of wood derivatives, paper derivatives, cellulose fibers, polymers, silica particles, diatomaceous earth, minerals, metal oxides, metal salts, metal particles, metals, and asphalt bitumen; and a polymer dispersing and stabilizing the graphite material and the additional components, wherein the graphite material of the macrometric, micrometric, or nanometric size is at least one material selected from the group consisting of graphite, graphene, charcoal, pitch, activated carbon, pyrolytic carbon, coke, combustion residues of organic material, combinations thereof, and derivatives thereof, and wherein the polymer is a modified polyketone with a material selected from the group consisting of primary amines, alcohols, and mercaptans, wherein the primary amines, the alcohols, or the mercaptans contain a Diels-Alder active group acting as diene, or dienophile, or a combination thereof, and are selected from the group consisting of cyclopentadiene, dicyclopentadiene, furan, butadiene, anthracene, tetracene, pentacene, maleimide, maleic anhydride, maleic imida, benzoquinone, alkyn, alkene, phthalic, and combinations thereof, wherein the modified polyketone has a carbon chain in a length of greater than 50 carbons, wherein the modified polyketone has a glass transition temperature of below 200 °C or a melting temperature of below 200 °C or both below 200 °C, and wherein the nanocomposite is obtained by mixing the modified polyketone with the graphite material at a polymer:graphite mass ratio in a range from 80:20 to 99.9:0.1 at a temperature in a range from about 40 °C to about 120 °C, in the absence of solvent, such that the graphite material is exfoliated in situ into graphene-like nanostructures.

2. The nanocomposites of claim 1, wherein the diene or dienophile groups contained in the primary amines, the alcohols, or the mercaptans are selected from furan compounds.

3. The nanocomposites of claim 2, wherein said primary amine is substituted with a group comprising the diene or the dienophile and is furfurilamine.

4. The nanocomposites of claim 1, wherein the modified polyketone with the material selected from the group consisting of primary amines, alcohols, and mercaptans has additional hanging groups selected from the group consisting of saturated or unsaturated hydrocarbon chains, alcohols, amines, esters, ethers, polyethers, mercaptans, carboxylic acids, sulfates, sulfonates, sulfones, phosphates, and phosphonates.

5. The nanocomposites of claim 4, wherein the additional hanging groups have spacer groups of a short carbon chain or a long carbon chain selected from the group consisting of modified polyketone, polyesters, polyethers, polyamines, polyolefins, and their functionalized derivatives.

6. The nanocomposites of claim 1, wherein the nanocomposites further comprise a cross-linker of reversible joints between said graphite material and said polymer, between the polymer and the polymer, and between the graphite material and the graphite material.

7. The nanocomposites of claim 6, wherein said cross-linker is bis-maleimide.

8. The nanocomposites of claim 1, wherein the wood derivatives and the paper derivatives are selected from the group consisting of chips, sawdust, cellulose pulp, and cellulose, the metal oxides are selected from the group consisting of copper oxide, titanium oxide, and zinc oxide, the metal salts are selected from the group consisting of lithium salts, and copper salts, and the metals are selected from the group consisting of copper, titanium, zinc, aluminum, silver, and gold.

9. The nanocomposites of claim 1, wherein the nanocomposites are configured to be used in production of thermoconductive materials, electroconductors, heat electricity converters, filler compositions, self-repairing materials with electricity, self-repairing materials with heat, self-assembling materials with electricity, self-assembling materials with heat, additives, and binders, wherein the nanocomposites are mixed with materials selected from the group consisting of wood derivatives, paper derivatives, polymers, silica particles, diatomaceous earth, minerals, metal oxides, metal particles, metals, and asphalt bitumen.

10. A method of preparation of the nanocomposites of claim 1, comprising:

(a) functionalizing the modified polyketone by a Paal-Knorr reaction with a material selected from the group consisting of primary amines, alcohols, and mercaptans, containing the Diels-Alder active group acting as diene, or dienophile, or a combination thereof, wherein the primary amines, the alcohols, and the mercaptans are in a molar proportion to the diketone groups of said modified polyketone in a range from 1 to 100%, and said Paal-Knorr reaction is performed at a temperature in a range from 0° to 200 °C;

(b) mixing the functionalized polyacetone obtained in the functionalizing (a) with a graphite of a macrometric, micrometric, or nanometric size selected from the group consisting of graphite, graphene, charcoal, pitch, activated carbon, pyrolytic carbon, coke, combustion residues of organic material, combinations thereof, and derivatives thereof, wherein the mixing is carried out at a glass transition temperature or at a melting temperature of the functionalized modified polyketone obtained in the functionalizing (a) until an increase in viscosity of a resulting mixture is dispersed homogeneously followed by cooling the mixture to a room temperature, and a proportion of said modified polyketone functionalized with hanging groups that act as the diene or the functionalized dienophile to the graphite materials is in a range from 10%:90% to 99.9%: 0.1%; and (c) cooling the mixture, wherein the functionalizing (a) or the mixing (b) or both are performed with or without solvent.

11. The method of claim 10, wherein the method further comprising subjecting the cooled mixture resulting from the cooling (c) to successive cycles of heating and cooling, until the resulting nanocomposites reaches a constant viscosity.

12. The method of claim 10, wherein, the method subsequently, further comprises subjecting the resulting nanocomposites to grinding, compression molding, injection, extrusion, electrospinning, lyophilization, or expansion, with or without using a supercritical solvent or a fluid, or a combination thereof, so as to be in a form selected from the group consisting of powder, fiber, prism, monolith, sheet, sponge, and aerogel.

13. The method of claim 10, wherein the diene or dienophilic groups contained in the primary amines, the alcohols, or the mercaptans are selected from the group consisting of cyclopentadiene, dicyclopentadiene, furan, butadiene, anthracene, tetracene, pentacene, maleimide, maleic anhydride, maleic imida, benzoquinone, alkynone, alkene, phthalic, and combinations thereof.

14. The method of claim 13, wherein said primary amines with hanging groups comprising the diene or dienophile groups are selected from primary amines comprising furan.

15. The method of claim 14, wherein said primary amine comprising furan is furfurylamine.

16. The method of claim 10, wherein when the functionalizing (a) or the mixing (b) or both are conducted in the presence of solvent, said solvent is selected from the group consisting of water, tetrahydrofuran (THF), acetonitrile, N-methyl-2-pyrrolidone (NMP), dimethylformamide (DMF), 2 propanol, 1 propanol, ethanol, toluene, benzene, chlorobenzene, 1,2-dichlorobenzene chloroform, dichloromethane, saturated or unsaturated alicyclic hydrocarbon, an aromatic hydrocarbon, an alcohol comprising at least 3 carbon atoms, a glycol, a halogenated hydrocarbon, a ketone, an ester, an ether, a glycol ether, and combinations thereof.

17. The method of claim 16, wherein said solvent is the THF, the 1-propanol, the 1,2-dichlorobenzene chloroform, the dichloromethane, or the dimethylformamide (DMF).

18. The method of claim 10, wherein simultaneously or after the functionalizing (a), additional modifications of the modified polyketones are performed with the primary amines, the alcohols, or the mercaptans, containing a material selected from the group consisting of organic groups of saturated or unsaturated carbon chains, alcohols, amines, esters, ethers, polyethers, mercaptans, carboxylic acids, sulfates, sulfonates, sulphones, phosphates, and phosphonates.

19. The method of claim 10, wherein in the functionalizing (a), a proportion of the modified polyketones to the primary amine with hanging groups comprising the diene or dienophile groups comprising furan, is in a range from 80%: 20% to 99.9%: 0.1%.

20. The method of claim 10, wherein the method further comprises:

(d) adding additives in the functionalizing (a) or the mixing (b) or both, or after the cooling (c), wherein the additives are selected from the group consisting of bismaleimide, maleic anhydride, maleic amide, benzoquinone, alkyn, alkene, and organic and inorganic materials of a macrometric, micrometric, or nanometric size, the organic and inorganic materials being selected from the group consisting of wood derivatives, paper derivatives, cellulose fibers, polymers, silica particles, diatomaceous earth, minerals, metal oxides, metal salts, metal particles, metals, and asphalt bitumen, and the mixing is carried out at a temperature above a glass transition temperature of the functionalized polymer obtained in the functionalizing (a) or above the melting temperature of the functionalized polymer obtained in the functionalizing a) (a).

21. The method of claim 20, wherein the wood derivatives and the paper derivatives are a material selected from the group consisting of shavings, sawdust, cellulose pulp, and cellulose, the metal oxides are selected from the group consisting of copper oxide, titanium oxide and zinc oxide, the metal salts are selected from the group consisting of lithium salts, and copper salts, and the metals are selected from the group consisting of copper, titanium, zinc, aluminum, silver, and gold.

22. The nanocomposites of claim 1, wherein the graphite material is a graphite particle of a micrometric size, and the graphite particle is exfoliated in situ into a graphene-like nanostructure of a sub-micrometric size.

* * * * *